(12) United States Patent
Chen et al.

(10) Patent No.: US 10,856,311 B2
(45) Date of Patent: Dec. 1, 2020

(54) SYSTEMS AND METHODS OF COMMUNICATING VIA SUB-BANDS IN WIRELESS COMMUNICATION NETWORKS

(71) Applicant: QUALCOMM Incorporated, San Diego, CA (US)

(72) Inventors: Jialing Li Chen, San Diego, CA (US); Lin Yang, San Diego, CA (US); Bin Tian, San Diego, CA (US); Sameer Vermani, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/275,315

(22) Filed: Feb. 13, 2019

(65) Prior Publication Data

US 2019/0281614 A1 Sep. 12, 2019

Related U.S. Application Data

(60) Provisional application No. 62/639,426, filed on Mar. 6, 2018.

(51) Int. Cl.
*H04W 72/12* (2009.01)
*H04W 72/04* (2009.01)
*H04L 5/00* (2006.01)

(52) U.S. Cl.
CPC ....... *H04W 72/1263* (2013.01); *H04L 5/0007* (2013.01); *H04L 5/0041* (2013.01);
(Continued)

(58) Field of Classification Search
CPC .......... H04W 72/1263; H04W 72/0453; H04L 5/0041; H04L 5/0007; H04L 5/0044; H04L 5/0048
See application file for complete search history.

(56) References Cited

U.S. PATENT DOCUMENTS

2014/0321401 A1\* 10/2014 Zhang ................... H04W 72/12
370/329
2015/0146653 A1 5/2015 Zhang et al.
(Continued)

OTHER PUBLICATIONS

PCT Application No. PCT/US2019/020604 International Search Report and Written Opinion, dated May 10, 2019, 12 pages.

*Primary Examiner* — Thai Nguyen
(74) *Attorney, Agent, or Firm* — Kevin M. Donnelly; Delizio Law, PLLC

(57) ABSTRACT

Methods and apparatuses are disclosed for communicating over a wireless communication network. In one aspect, an apparatus can include a memory that stores instructions, a processor, and a segment parser. The memory can be configured to store instructions. The processing system is configured to execute the instructions to generate a message according to a tone plan for transmission to one or more destination devices within one of a 240 or 320 MHz total channel bandwidth. The processing system is further configured to provide the message for transmission over the 240 or 320 MHz total channel bandwidth, where the message is encoded for transmission by at least one of a binary convolutional coded (BCC) interleaver or a low density parity check (LDDC) tone mapper. The segment parser is configured to segment the total channel bandwidth into a plurality of segments of equal or unequal sub-band bandwidths or number of data tones.

29 Claims, 15 Drawing Sheets

(52) U.S. Cl.
CPC ....... *H04W 72/0453* (2013.01); *H04L 5/0044* (2013.01); *H04L 5/0048* (2013.01)

(56) References Cited

U.S. PATENT DOCUMENTS

2015/0349995 A1    12/2015  Zhang et al.
2017/0034317 A1     2/2017  Kenney et al.
2019/0021045 A1*    1/2019  Kim .................... H04W 72/042
2020/0106492 A1*    4/2020  Cao ..................... H04B 7/0421

* cited by examiner

| Sym Dur | Tone Spacing | 80MHz | 160MHz | 320MHz |
|---|---|---|---|---|
| Option 1 | 1x | 312.5kHz | 256 | 512 | 1024 |
| Option 2 | 2x | 156.25kHz | 512 | 1024 | 2048 |
| Option 3 | 4x | 78.125kHz | 1024 | 2048 | 4096 |

FIG. 5A

| FFT Size | 256 | 512 | 1024 | 2048 | 4096 |
|---|---|---|---|---|---|
| Index Range | [-128, 127] | [-256, 255] | [-512, 511] | [-1024, 1023] | [-2048, 2047] |

FIG. 5B

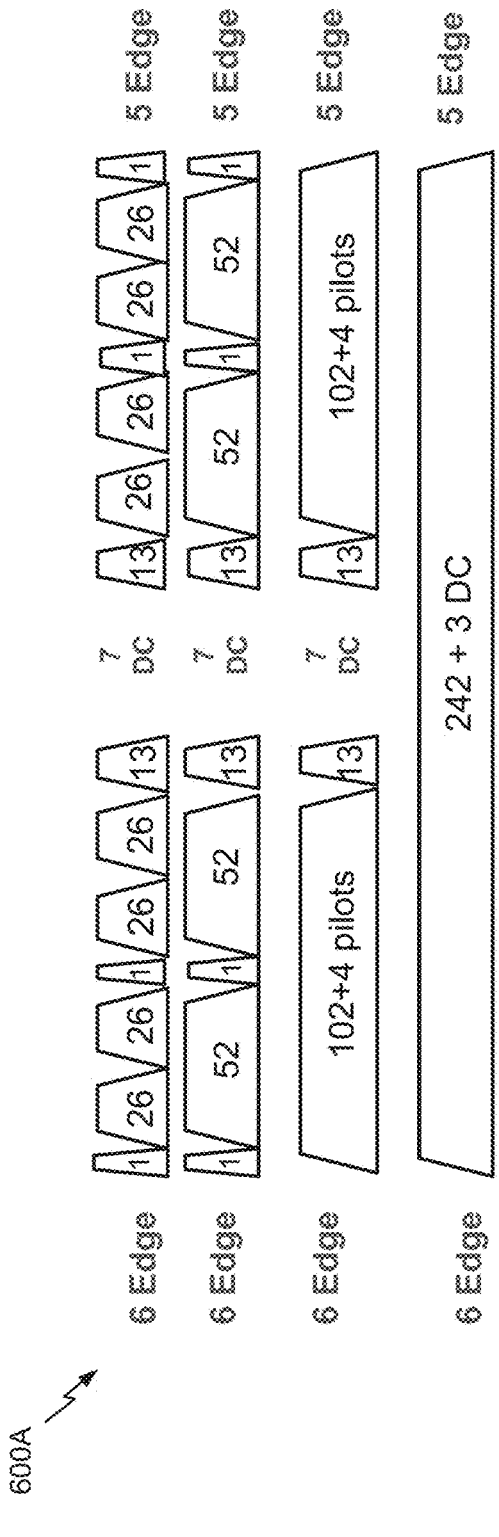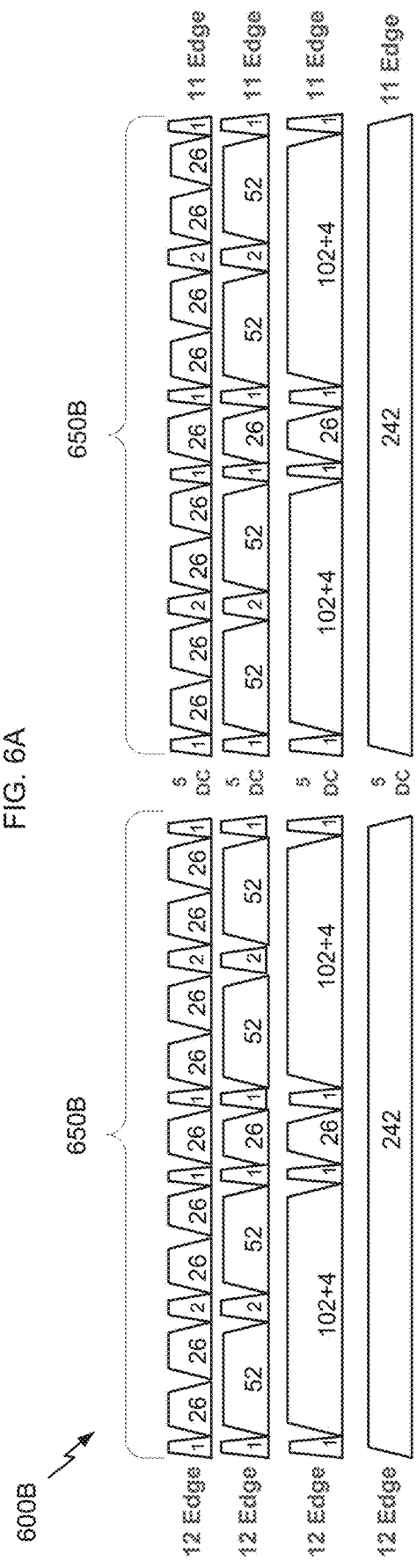
FIG. 6A
FIG. 6B

\*RUs' tone indices, Null, Data & Pilot subcarrier indices

| RU Size | Subcarrier Indices |
|---|---|
| 160 MHz Option | 26, 52, 106, 242, 484, 996 | Subcarrier indices in lower 80MHz −512<br>Subcarrier indices in upper 80MHz +512 |
| 320 MHz Option | 26, 52, 106, 242, 484, 996 | Subcarrier indices in lowest 80MHz −1536<br>Subcarrier indices in second lowest 80MHz −512<br>Subcarrier indices in second highest 80MHz +512<br>Subcarrier indices in highest 80MHz +1536 |

FIG. 7

| Case | New RU Sizes | Number of data tones | OFDM symbol |
|---|---|---|---|
| 2 equal segments | 2x484 | 2x468 | • Option 1: Use equal parsing (ratio of 1:1, 1:1:1 or 1:1:1:1) of every s bits, where s=floor(N_BPSSC/2), and N_BPSSC is the modulation order<br>• Option 2: Sequentially parse bits to each segment |
| 3 equal segments | 3x484 or 3x996 | 3x468 or 3x980 | |
| 4 equal segments | 4x484 or 4x996 | 4x468 or 4x980 | |
| 2 unequal segments | 484+996 | 468+980 | • Option 1a: Use equal parsing (ratio of 1:1 or 1:1:1) of every s bits, until all 484-tone segments are filled, and then parse the remaining bits to the 996-tone segment until it is filled<br>• Option 1b: Use ratio of 1:2 and 1:1:2 parsing of every s bits, until all 484-tone segments are filled, and then parse the remaining bits to the 996-tone segment until it is filled<br>• Option 2: Sequentially parse bits to each segment |
| 3 unequal segments | 2x484+996 | 2x468+980 | |

FIG. 10

| New RU Size | Number of data tones | Total number of data tones ($N\_SD\_total$) | Divisors of total number of data tones (excluding 1 and $N\_SD\_total$) | DTM & DTM_DCM candidates |
|---|---|---|---|---|
| 3x996 | 3x980 | 2940 | 2,3,4,5,6,7,10,12,14,15,20,21, 28,30,35,42,49,60,70,84,98, 105,140,147,196,210,245,294, 420,490,588,735,980,1470 | 14,15,20,21,28,3, 0,35,42,49,60,70 |
| 4x996 | 4x980 | 3920 | 2,4,5,7,8,10,14,16,20,28,35,40,49,56, 70,80,98,112,140,196,245,280,392, 490,560,784,980,1960 | 14,16,20,28,35,40,49, 56,70,80,98 |
| 2x484 | 2x468 | 936 | 2,3,4,6,8,9,12,13,18,24,26,36,39,52, 72,78,104,117,156,234,312,468 | 9,12,13,18 |
| 3x484 | 3x468 | 1404 | 2,3,4,6,9,12,13,18,26,27,36,39,52,54, 78,108,117,156,234,351,468,702 | 18,26,27,36 |
| 4x484 | 4x468 | 1872 | 2,3,4,6,8,9,12,13,16,18,24,26,36,39,48, 52,72,78,104,117,144,156,208,234, 312,468,624,936 | 16,18,24,26,36,39,48 |
| 484+996 | 468+980 | 1448 | 2,4,8,181,362,724 | 8,181 |
| 2x484+996 | 2x468+980 | 1916 | 2,4,479,958 | 4,479 |

FIG. 11

SYSTEMS AND METHODS OF COMMUNICATING VIA SUB-BANDS IN WIRELESS COMMUNICATION NETWORKS

CROSS-REFERENCE TO RELATED APPLICATIONS

This Patent Application claims priority to U.S. Provisional Patent Application No. 62/639,426 filed Mar. 6, 2018 entitled "SYSTEMS AND METHODS OF COMMUNICATING VIA SUB-BANDS IN WIRELESS COMMUNICATION NETWORKS," and assigned to the assignee hereof. The disclosure of the prior Application is considered part of and is incorporated by reference in this Patent Application.

FIELD

This disclosure generally relates to wireless communications, and more particularly, to methods and apparatuses for communicating via 240 and/or 320 MHz sub-bands.

BACKGROUND

In many telecommunication systems, communications networks can be used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (for example, circuit switching vs. packet switching), the type of physical media employed for transmission (for example, wired vs. wireless), and the set of communication protocols used (for example, Internet protocol suite, SONET (Synchronous Optical Networking), Ethernet, etc.).

Wireless networks can be often preferred when the network elements can be mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices can be a communication network, congestion and inefficient link usage can result. As such, systems, methods, and non-transitory computer-readable media can be needed for improving communication efficiency in wireless networks. These systems, methods, and/or non-transitory media may utilize various interleaver and tone mapper designs for communications in 240 and/or 320 MHz bandwidths.

SUMMARY

Various implementations of systems, methods and devices within the scope of the appended claims each have several aspects, no single one of which can be solely responsible for the desirable attributes described herein. Without limiting the scope of the appended claims, some prominent features can be described herein.

Details of one or more implementations of the subject matter described in this specification can be set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus configured to communicate over a wireless communication network. The apparatus comprises a memory that stores instructions, a processor coupled to the memory, and a segment parser coupled to the processor and the memory. The memory can be configured to store instructions. The processor is configured to execute the instructions to generate a message according to a tone plan for transmission to one or more destination devices within one of a 240 or 320 MHz total channel bandwidth. The processor is further configured to provide the message for transmission over the 240 or 320 MHz total channel bandwidth, where the message is encoded for transmission by at least one of a binary convolutional coded (BCC) interleaver or a low density parity check (LDDC) tone mapper. The segment parser is configured to segment the 240 or 320 MHz total channel bandwidth into a plurality of segments of equal or unequal sub-band bandwidths or number of data tones.

BRIEF DESCRIPTION OF THE DRAWINGS

FIGS. 5A-5B show example tone spacings and index ranges for different fast Fourier transform (FFT) sizes and symbol durations at each of 80, 160, and 320 MHz transmissions.

FIGS. 6A-6C show example 20 MHz, 40 MHz, 80 MHz, 160 MHz, and 320 MHz transmissions using 26-, 52-, 106-, 242-, 484-, 996- and/or other tone allocations.

FIG. 7 shows an example of resource unit (RU) subcarrier indices.

FIG. 10 shows various example segment parser designs based on RU sizes, numbers of data tones, and segmentation of transmissions on the 240 and 320 MHz bandwidths.

FIG. 11 shows various example tone mapper design features based on RU sizes, numbers of data tones, a total number of data tones, and divisors if the total number of data tones for the 240 and 320 MHz bandwidths.

DETAILED DESCRIPTION

Figure 1:
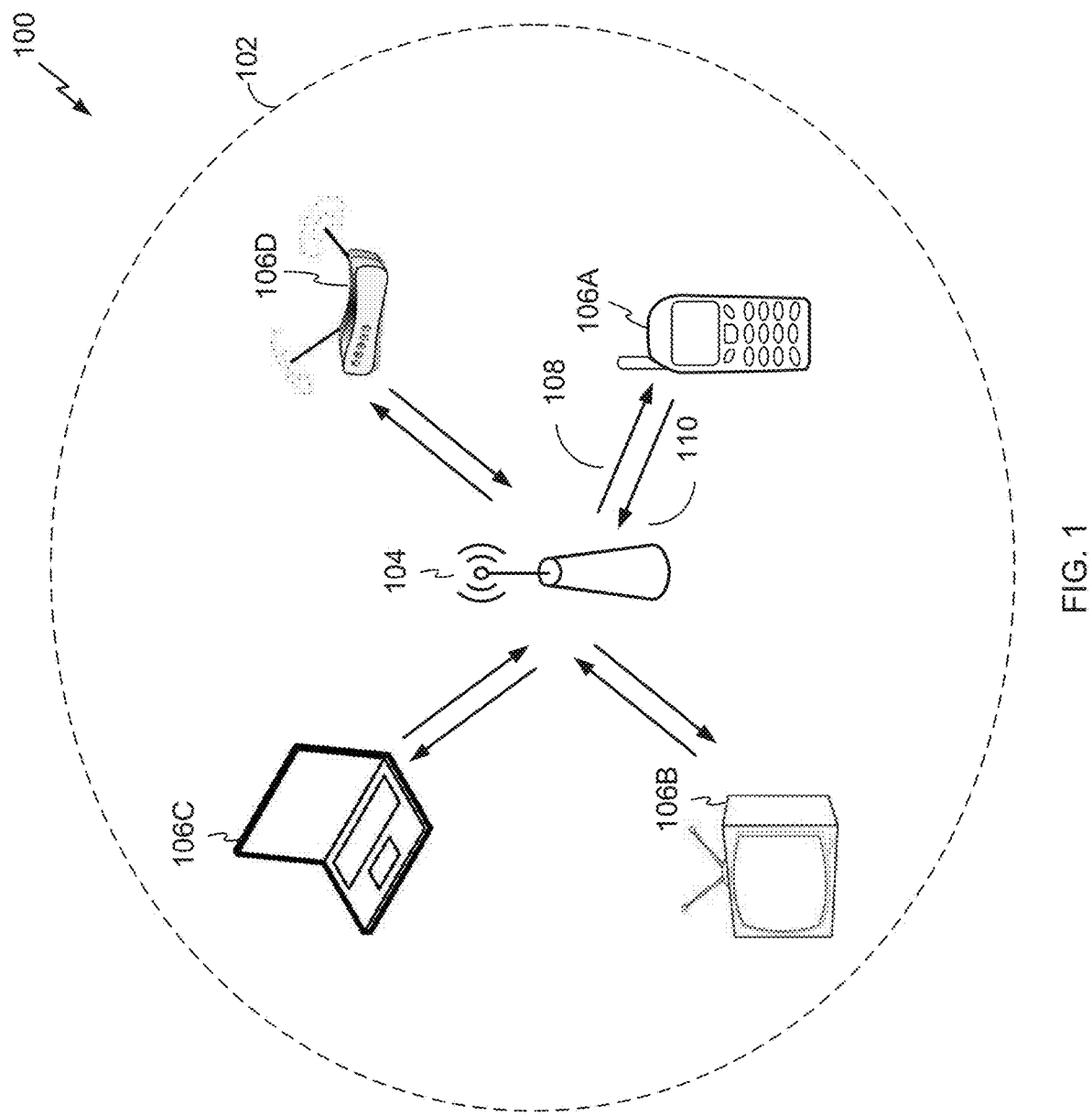
FIG. 1 illustrates an example of a wireless communication system in which aspects of the present disclosure can be employed.

Various aspects of the novel systems, apparatuses, and methods can be described more fully hereinafter with reference to the accompanying drawings. The teachings of this disclosure can, however, be embodied in many different forms and should not be construed as limited to any specific structure or function presented throughout this disclosure. Rather, these aspects can be provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects can be described herein, many variations and permutations of these aspects fall within the scope of the disclosure. Although some benefits and advantages of the preferred aspects can be mentioned, the scope of the disclosure is not intended to be limited to particular benefits, uses, or objectives. Rather, aspects of the disclosure can be intended to be broadly applicable to different wireless technologies, system configurations, networks, and transmission protocols, some of which can be illustrated by way of example in the figures and in the following description of the preferred aspects. The detailed description and drawings can be merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct sequence spread spectrum (DSSS) communications, a combination of OFDM and DSSS communications, or other schemes.

In some implementations, a WLAN includes various devices which can be the components that access the wireless network: For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (for example, IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that can be based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that can be distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols can be sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (for example, implemented within or performed by) a variety of wired or wireless apparatuses (for example, nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (for example, a cellular phone or smart phone), a computer (for example, a laptop), a portable communication device, a headset, a portable computing device (for example, a personal data assistant), an entertainment device (for example, a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
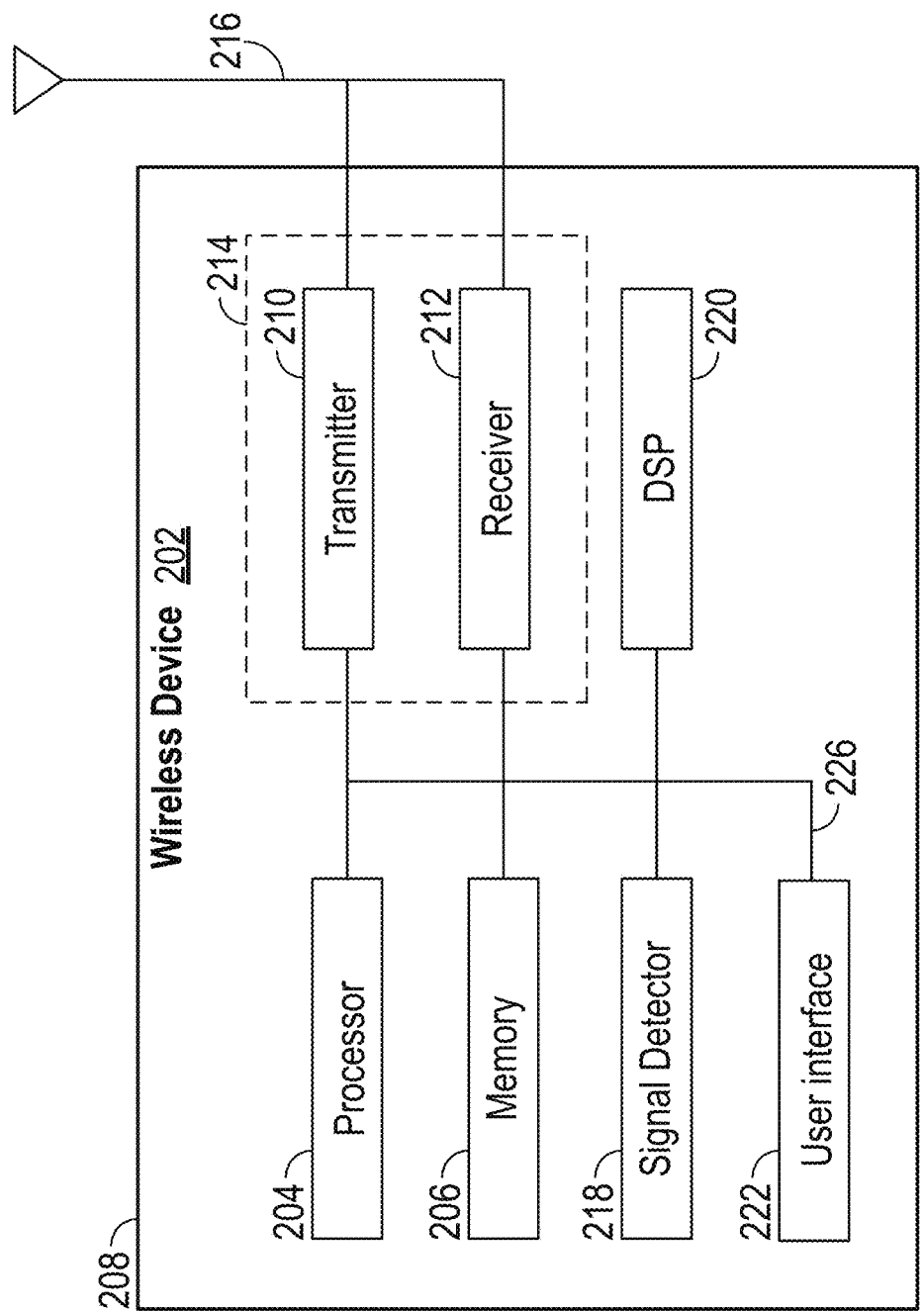
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (for example, in source code format, binary code format, executable code format, or any other suitable format of code). The instructions, when executed by the one or more processors, cause the processing system to perform the various functions described herein. In some implementations, the processor 204, the processing system, and/or the instructions may control one or more components (for example, an interleaver or a segmenter) to generate a transmission according to a tone plan.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarder per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components can be illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (for example, acknowledging receipt of data, polling of APs, area-clearing operations, channel acquisition, carrier-sensing maintenance functions, etc.). Management frames can be used for various supervisory functions (for example, for joining and departing from wireless networks, etc.

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some implementations, the high-efficiency 802.11 protocol described herein can allow for HEW and legacy stations to interoperate according to various OFDMA tone plans (which can also be referred to as tone maps). In some implementations, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some implementations, APs 104 can transmit on a wireless medium according to various DL, tone plans for HEW STAs. For example, with respect to FIG. 1, the STAs 106A-106D can be HEW STAs. In some implementations, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various implementations, a 1× symbol duration can be 3.2 µs, a 2× symbol duration can be 6.4 µs, and a 4× symbol duration can be 12.8 µs. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
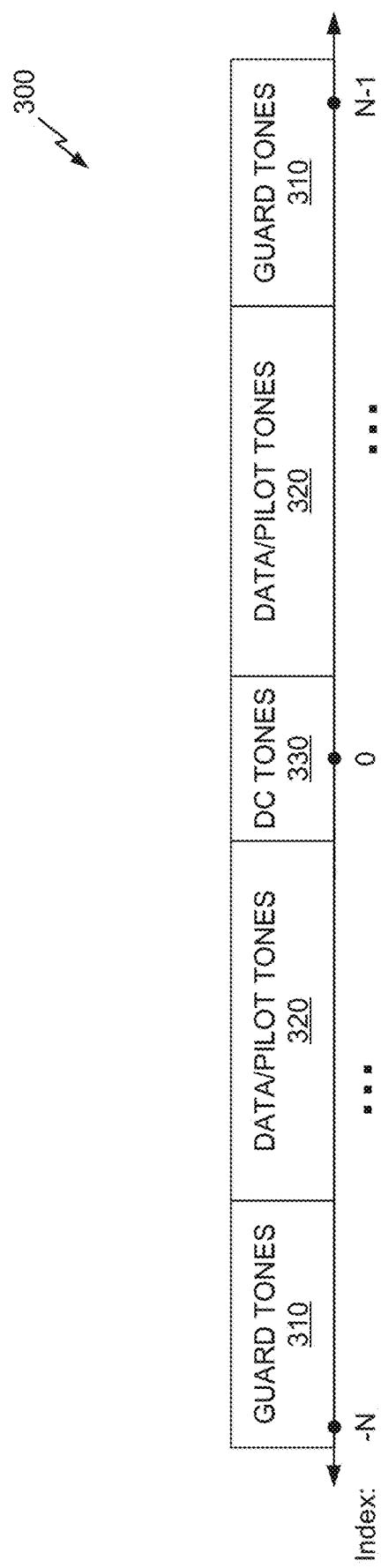
FIG. 3 shows an example 2N-tone plan.

FIG. 3 shows an example 2N-tone plan 300. In some implementations, the tone plan 300 corresponds to OFDM tones, in the frequency domain, generated using a 2N-point fast Fourier transform (FFT). The tone plan 300 includes 2N OFDM tones indexed −N to N−1. The tone plan 300 includes two sets of edge or guard tones 310, two sets of data/pilot tones 320, and a set of direct current (DC) tones 330. In various implementations, the edge or guard tones 310 and DC tones 330 can be null. In various implementations, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which can be each 12.8 µs in duration (whereas symbols in certain other IEEE 802.11 protocols may be 3.2 µs in duration).

In some aspects, OFDMA tone plans may be provided for transmission using a 2× symbol duration, as compared to various IEEE 802.11 protocols. For example, the 2× symbol duration may use a number of symbols which can be each 6.4 µs in duration (whereas symbols in certain other IEEE 802.11 protocols may be 3.2 µs or 12.8 µs in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, 80, 160, 240, or 320 MHz (or a combination thereof), and it may be desirable to use a tone plan that can be used for any of these bandwidths. Further, a tone plan may be simple in that it uses a smaller number of building block sizes. For example, a tone plan may contain a unit which may be referred to as resource unit (RU). This unit may be used to assign a particular amount of wireless resources (for example, bandwidth and/or particular tones) to a particular user. For example, one user may be assigned bandwidth as a number of RUs, and the data/pilot tones 320 of a transmission may be broken up into a number of RUs.

A tone plan may also be chosen based on efficiency. For example, transmissions of different bandwidths (for example, 20, 40, 80, 160, 240, or 320 MHz, or a combination thereof) may have different numbers of tones. Reducing the number of leftover tones may be beneficial. Further, it may be beneficial if a tone plan is configured to preserve 20, 40, 80, 160, 240, and/or 320 MHz boundaries, when needed. For example, it may be desirable to have a tone plan which allows each 20, 40, 80, 160, 240, or 320 MHz portion to be decoded separately from each other, rather than having allocations which can be on the boundary between two different 20, 40, 80, 160, 240, or 320 MHz portions of the bandwidth. For example, it may be beneficial for interference patterns to be aligned with 0, 40, 80, 160, 240, or 320 MHz channels. Further, it may be beneficial to have channel bonding, which may also be known as preamble puncturing, such that when a 20 MHz transmission and a 40 MHz transmission can be transmitted to create a 20 MHz "hole" in the transmission when transmitted over 80, 160, 240, or 320 MHz. This may allow, for example, a legacy packet to be transmitted in this unused portion of the bandwidth. This puncturing may apply to any transmission (for example, 20, 40, 80, 160, 240, or 320 MHz, etc.) and may create "holes" of at least 20 MHz in the transmission regardless of the channel or bandwidth being used. Finally, it may also be advantageous to use a tone plan which provides for fixed pilot tone locations in various different transmissions, such as in different bandwidths.

As data transmission rate demands increase with additional devices joining networks or additional data being added for transmission over networks, larger channel bandwidths may be introduced, for example for orthogonal frequency-division multiple access (OFDMA) transmissions. In one example, tone plans for a 320 MHz total channel bandwidth may be introduced to assist in increasing peak system transmission data rates and to more efficiently utilize available channels. For example, as new frequencies are available for use (for example, 6 GHz vs. previous 5 GHz), these new tone plans for the larger total channel bandwidths may more efficiently utilize the newly available channels. Moreover, an increased total bandwidth which may be provided by these new tone plans may allow for better rate vs range tradeoff. In this case, the same or a similar transmission rate may be used to provide larger coverage if a larger total bandwidth is used. Additionally, the larger total channel bandwidths may also increase tone plan efficiency (for example, for a particular BW, how many tones could be used for data transmission) and may also increase a number of guard bands. As with any total channel bandwidth being used, different modes may be available depending on channel availability. For example, current 80 MHz channel bandwidths may be separated into 20 MHz, 40 MHz, or 80 MHz modes.

Figure 4A:
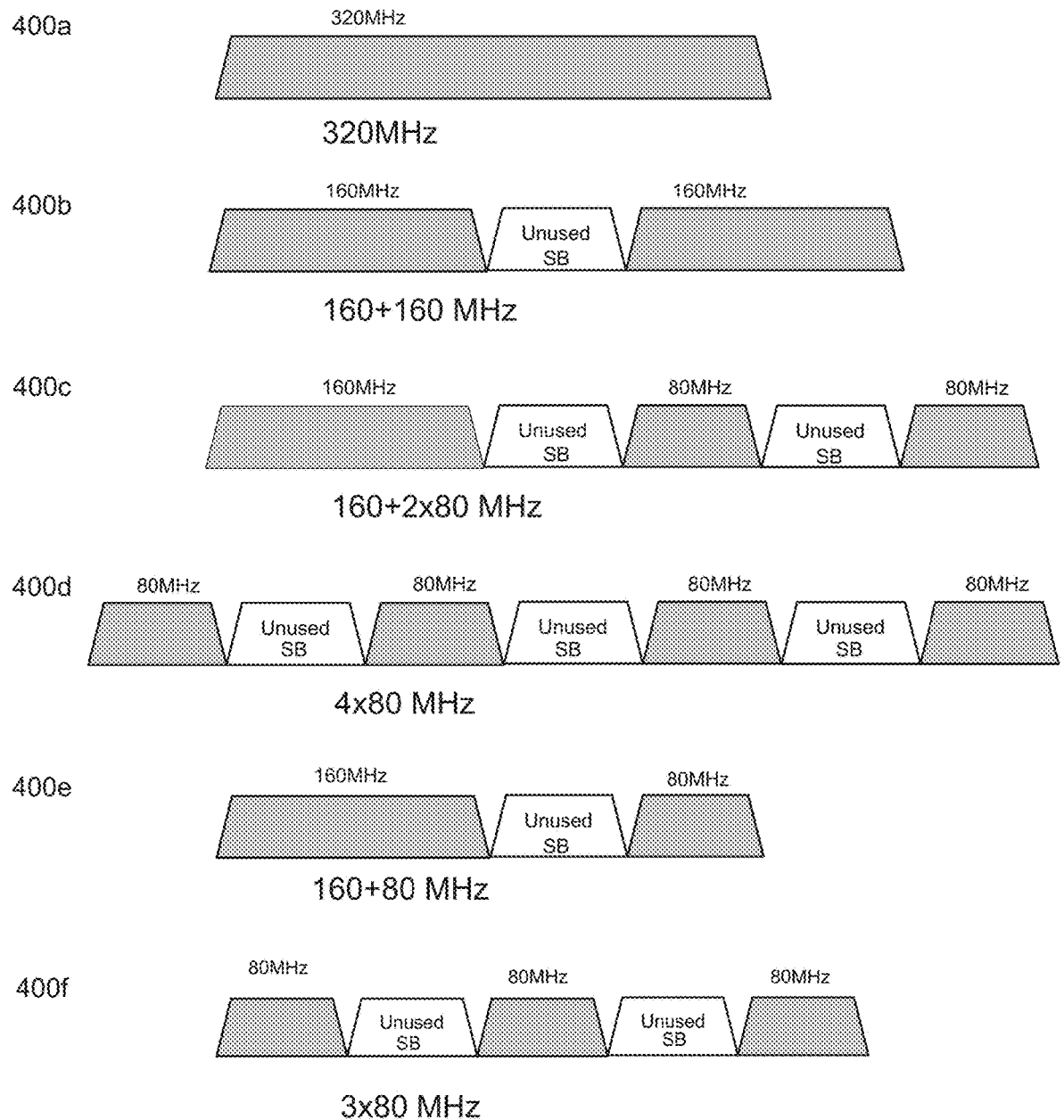
FIGS. 4A-4B are example illustrations of different modes available for a 240 or 320 MHz transmission.
Figure 4B:
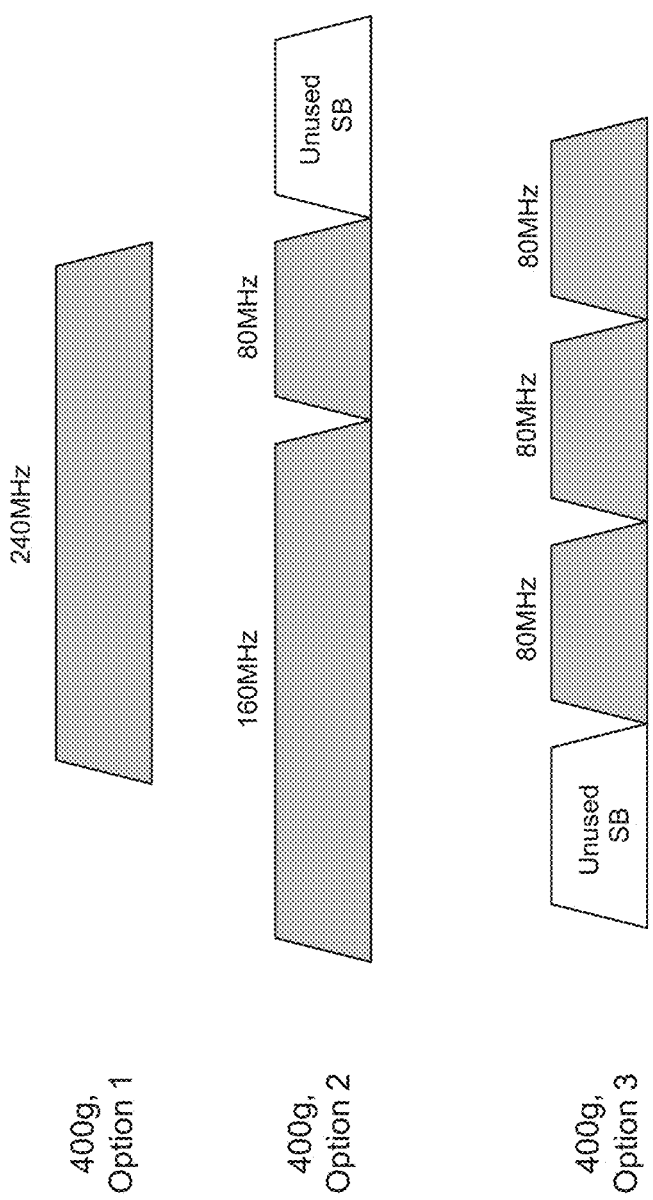

FIGS. 4A and 4B are illustrations of different modes 400a-400g available for a 240 or 320 MHz transmission. As shown in FIGS. 4A and 4B, the 240 or 320 MHz transmissions may be transmitted in at least nine different modes as shown in 400a-400g. Each of the modes 400a-400g may represent a different combination of channel bandwidth (BW) and frequency bands that may be used, depending on channel availability (for example, in 2.4, 5, and/or 6 GHz networks). In a first mode 400a, the 320 MHz transmission may be transmitted in a single, contiguous 320 MHz frequency band. In a second mode 400b, the 320 MHz transmission may be transmitted in two disjoint 160 MHz frequency bands, where each of the disjoint 160 MHz frequency bands are contiguous frequency bands. As shown, each of the frequency bands is separated by unused sub-bands (SBs). In a third mode 400c, the 320 MHz transmission may be transmitted in three disjoint frequency bands, where one of the disjoint frequency bands is a 160 MHz frequency contiguous frequency band and the other two disjoint frequency bands are 80 MHz frequency contiguous frequency bands. In this third mode 400c, while the 320 MHz transmission is shown with the 160 MHz frequency band first followed by the two 80 MHz frequency bands, this arrangement of 160 and 80 MHz frequency bands may be in any order. As shown, each of the frequency bands is separated by unused SBs. In a fourth mode 400d, the 320 MHz transmission may be transmitted in four disjoint frequency bands, where each of the disjoint frequency bands is an 80 MHz frequency contiguous frequency band. In a fifth mode 400e, a 240 MHz bandwidth may comprise a 160 MHz and an 80 MHz frequency band separated by an unused 80 MHz frequency band. In a sixth mode 400f, the 240 MHz bandwidth may comprise three 80 MHz frequency bands separated by unused 80 MHz frequency bands. In a seventh mode 400g, a 240 MHz transmission may be transmitted in a single, contiguous 240 MHz bandwidth. In a first option for the seventh mode 400g, the 240 MHz bandwidth may comprise a single, contiguous 240 MHz frequency band with a single unused 80 MHz frequency band either preceding or following the 240 MHz frequency band. In a second option for the seventh mode 400g, the 240 MHz bandwidth may comprise a single 160 MHz frequency band and a single 80 MHz frequency band that are adjacent to each other, thus forming the contiguous 240 MHz bandwidth. In some implementations, the 160 MHz frequency band will precede the 80 MHz frequency band or vice versa. The 160 MHz and 80 MHz frequency bands may be preceded or followed by an unused 80 MHz frequency band. In a third option for the seventh mode 400g, the 240 MHz bandwidth may comprise three consecutive 80 MHz frequency bands, thus forming a contiguous 240 MHz bandwidth. The 80 MHz frequency bands may be preceded or followed by an unused 80 MHz frequency band. For any of the modes described herein, the unused SBs that separate the contiguous frequency bands may be of any BW or of different BWs. In some implementations, tone plans may be designed and signal generation may be completed for contiguous frequency band of 80 MHz, 160 MHz, and 320 MHz bandwidth sizes. In some implementations, tone plans may be designed and signal generation may be completed for a contiguous frequency band of 240 MHz bandwidth size.

Thus, each of the modes 400a-400g may have one or more options for creating the 320 MHz transmission. The mode 400a may include (1) a first option of having a single 320 MHz tone plan, (2) a second option of duplicating two 160 MHz tone plans, one in each of two PHY 160 MHz SBs and separated by an unused SB, and (3) a third option of duplicating four 80 MHz tone planes, one in each of four PHY 80 MHz SBs separated by unused SBs. The mode 400b may include (1) a first option of using two 160 MHz tone plans, each in one PHY 160 MHz SB, and (2) a second option of duplicating four 80 MHz tone plans, one in each of four PHY 80 MHz SBs and separated by unused SBs. The mode 400c may include (1) a first option of having a single 160 MHz tone plan in one PHY 160 MHz SB and duplicating two 80 MHz tone plans in each of the remaining PHY 80 MHz SBs, and (2) a second option of duplicating four 80 MHz tone plane, one in each of four PHY 80 MHz SBs separated by unused SBs. The mode 400d may include an option of duplicating four 80 MHz tone plans, one in each of four PHY 80 MHz SBs separated by unused SBs. The mode 400e may include a first option of using a 160 MHz tone plan for the 160 MHz frequency band and an 80 MHz tone plan for the 80 MHz frequency band. The mode 400e may include a second option of using four duplicate 80 MHz tone plans, one in each of the 80 MHz frequency bands. The mode 400f may duplicate three 80 MHz tone plans, each in one of the 80 MHz frequency bands. The mode 400g may include (1) a first option of using a single 240 MHz tone plan for the 240 MHz frequency band, (2) a second option of using a 160 MHz tone plan and an 80 MHz tone plan preceded or followed by unused SBs, and (3) a third option of using three 80 MHz tone plans preceded or followed by unused SBs. In some implementations, options 2 and 3 for mode 400g may correspond to the tone plan proposals for modes 400e and 400f.

Based on these modes and options, different tone plans may be designed or generated for the 80, 160, 240, or 320 MHz BWs. Tone plan designs for 80 MHz, 160 MHz, and 320 MHz for 3 symbol duration options are the building blocks. In some implementations, tone plan designs for 240 MHz for 3 symbol duration options may be included in the building blocks. In some implementations, the different frequency bands may use different symbol durations. For example, for the second option of the 240 MHz frequency band, the 160 MHz frequency band may use a first symbol duration while the 80 MHz frequency band may use a second symbol duration different from the first symbol duration. In some implementations, the tone plans for the 240 MHz bandwidth can be generated or designed based on the building blocks (for example, the 80 and 160 MHz transmissions discussed herein).

The different modes described herein for the 240 or 320 MHz channel BW may be different options of symbol durations and tone spacings, depending on the mode being used.

FIGS. 5A-5B show example tone spacings and index ranges for different FFT sizes and symbol durations at each of 80, 160, and 320 MHz transmissions. Various 802.11 protocols may use 1× symbol durations (for example, 802.11a to 802.11ac). The 1× symbol durations may have a tone spacing of 312.5 kHz. Other 802.11 protocols may use 4× symbol durations (for example, 802.11ax). The 4× symbol durations may have a tone spacing of 78.125 kHz. Next generation 802.11 devices and standards may utilize either the 1× or 4× symbol durations or may introduce/utilize a 2× symbol duration of 6.4 µs having a tone spacing of 156.25 kHz. Specifically, FIG. 5A shows an FFT size for each option (for example, combination of symbol duration and tone spacing). For example, the 80 MHz channel BW has 256 tones available at 1× symbol duration and 312.5 kHz spacing (option 1), 512 tones available at 2× symbol duration and 156,25 kHz spacing (option 2), and 1024 tones available at 4× symbol duration and 78.125 kHz spacing (option 3). The 160 MHz channel BW has 512 tones available at 1× symbol duration and 312.5 kHz spacing, 1024 tones available at 2× symbol duration and 156.25 kHz spacing, and 2048 tones available at 4× symbol duration and 78.125 kHz spacing. The 320 MHz channel BW has 1024 tones available at 1× symbol duration and 312.5 kHz spacing, 2048 tones available at 2× symbol duration and 156.25 kHz spacing, and 4096 tones available at 4× symbol duration and 78.125 kHz spacing. In some aspects, 1× and 2× symbol durations may have similar benefits as compared to a 4× symbol durations. In some aspects, 1× and 2× symbol durations may have lower complexity, latency, and memory requirements due to corresponding smaller FFT sizes as compared to the 4× symbol duration, which has a higher complexity, latency, and memory requirement due to its larger FFT size. The 1× and 2× symbol durations each have a lower tone plan and cyclic prefix (CP) or guard interval (GI) efficiency than the 4× symbol duration that has a higher tone plan and GI efficiency. Furthermore, the 1× and 2× symbol durations may not have outdoor support while the 4× symbol duration may have outdoor support, although the 320 MHz bandwidth may be generally used indoors. The 1× and 2× symbol durations may need a new design to provide OFDMA support, as they cannot be mixed with high efficiency STAs in DL/UL OFDMA. However, the 4× symbol duration may provide OFDMA support, as it can be mixed with HE STAs in DL/UL OFDMA. When memory size is not being considered, then the 4× symbol duration may be a more natural choice for symbol duration. However, if maintaining memory size is the goal, then the 1× or 2× symbol duration may be considered. For 1× trigger based PPDU, the UL overhead of 50% in view of the 1.6 µs GI is too high, so the 2× symbol duration may be more likely a selection. In some implementations, reduced symbol durations may advantageously result in reduced complexity and reduced memory utilization.

Accordingly, the index ranges of the tones for each of these options is shown in FIG. 5B, which shows that 256 tones have a range of [−128, 127], 512 tones have a range of [−256, 255], 1024 tones have a range of [−512, 511], 2048 tones have a range of [−1024, 1023], and 4096 tones have a range from [−2048, 2047].

Overview

The 80 MHz 4× symbol duration tone plan for disjoint 80 MHz SBs may be based on 802.11ax 80 MHz single user (SU) and/or OFDMA tone plans. The 160 MHz 4× symbol duration tone plan for contiguous 160 MHz SBs that are disjoint from other SBs may use the 802.11ax SU or OFDMA 160 MHz tone plan.

The 320 MHz 4× symbol duration one plan for contiguous 320 MHz SBs may use two 160 MHz 4× symbol duration SU or OFDMA tone plans are duplicated in each 160 MHz SB of the 320 MHz SB. In this case, four 802.11ax 80 MHz 4× symbol duration SU or OFDMA tone plans are duplicated in each 80 MHz SB of the 320 MHz SB.

Figure 6C:
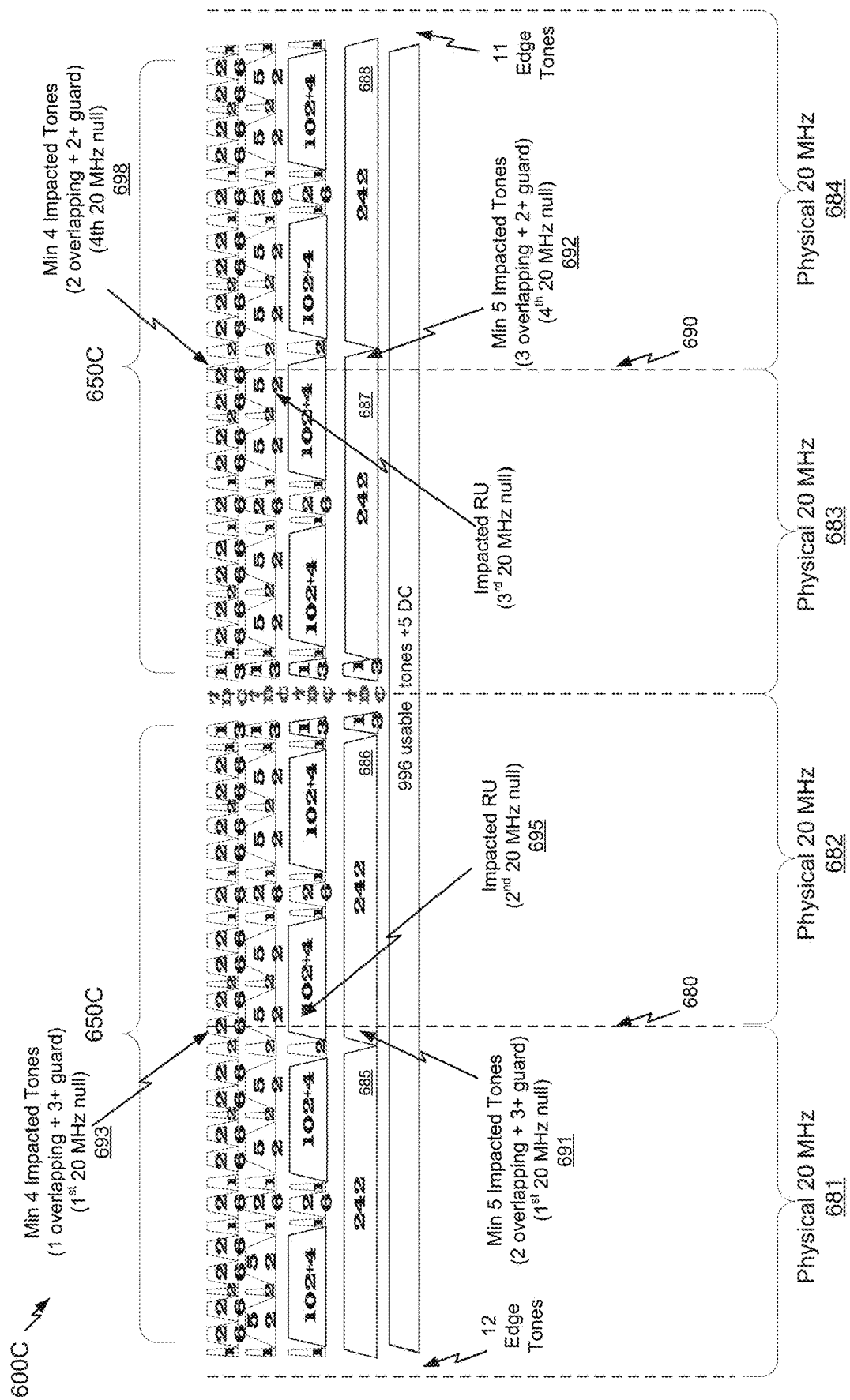

FIGS. 6A-6C show example 20 MHz, 40 MHz, and 80 MHz transmissions using 26-, 52-, 106-, 242-, 996- and/or other tone allocations.

Certain Implementations

In particular, FIG. 6A shows example 20 MHz transmissions 600A, having 6 left edge tones, 7 DC tones, and 5 right edge tones, and a total of 238 usable tones for OFDMA or 242 usable tones for an SU. Although FIG. 6A shows four example transmissions 600A using various combinations of 26-, 52-, 106-, and 242-tone blocks, allocations within any given transmission can include multiple tone blocks of different sizes, having different arrangements.

FIG. 6B shows example 40 MHz transmissions 600B, having 12 left edge tones, 5 DC tones, and 11 right edge tones, and a total of 484 usable tones. Although FIG. 6B shows four example transmissions 600B using various combinations of 26-, 52-, 106-, and 242-tone blocks, allocations within any given transmission can include multiple tone blocks of different sizes, having different arrangements. In the illustrated implementation, each 40 MHz transmission 600B is a duplicate of two 20 MHz transmissions 650B, which in various implementations can be the 20 MHz transmissions 600A of FIG. 6A or any other 20 MHz transmission discussed herein.

FIG. 6C shows example 80 MHz transmissions 600C having 12 left edge tones, 7 DC tones, and 11 right edge tones, and a total of 994 usable tones for OFDMA, and a total of 996 usable tones for whole bandwidth (BW) allocation with reduced number of DC tones being 5. Although FIG. 6C shows five example transmissions 600C using various combinations of 26-, 52-, 106-, 242-, and 996-tone blocks, allocations within any given transmission can include multiple tone blocks of different sizes, having different arrangements. In some implementations, a 80 MHz transmission 600C may be a duplicate of two 40 MHz transmissions (such as 650C), which in various implementations can be the 40 MHz transmissions 600B of FIG. 6B or any other 40 MHz transmission discussed herein.

The fifth of the illustrated transmissions 600C includes an SU tone plan having 5 DC tones. Accordingly, the SU tone plan can include 996 usable tones.

In some implementations, larger BW transmissions (for example, 160 MHz, 240 MHz and/or 320 MHz) may be generated based on the 20, 40, or 80 MHz tone plans shown and described in relation to FIGS. 6A-6C. For example, the 40 MHz transmissions and the 80 MHz transmissions may be duplicated (for example, four times each) to create the 160 MHz and 320 MHz transmissions, respectively.

Non-Contiguous and Fractional Bandwidth

As discussed above, the AP 104 can allocate one or more RUs to each STA 106A-106D. In some implementations, such allocations can be contiguous within the bandwidth of each transmission. In other implementations, the allocations can be non-contiguous. In some implementations, one or more sub-bands (SBs) can be selected for, or determined to contain, interfering wireless transmissions. Such SBs can be referred to as null sub-bands, and can contain one or more unallocated RUs.

Although various transmissions can be referred to herein as sub-bands, a person having ordinary skill in the art will appreciate, that in some implementations, sub-bands can be referred to as bands or channels. As used herein, "BSS BW" can refer to bandwidth setup for use in a particular BSS, for example an entire channel. "PPDU BW" can refer to bandwidth of a particular PPDU being transmitted. For example, the AP 104 (FIG. 1) can set up a BSS having 80 MHz BSS BW. Within the 80 MHz BSS BW, STAs 106A-106D can transmit on 20+40 MHz allocations due to interference in the null SB of the secondary channel. Thus, for FDMA packets, PPDU BW of a first packet can be 20 MHz, and PPDU BW of a second packet can be 40 MHz. For OFDMA packets, PPDU BW of a single packet can be 20+40 MHz. Although PPDU BW are discussed herein in terms of 20, 40, and 80 MHz allocations, a person of ordinary skill in the art would appreciate that the features described herein can be applied to BWs of other sizes and/or alignments.

Determination of Impacted RUs

Fractional or non-contiguous channel allocation is available in a variety of BSS BWs including 80 MHz, 160 MHz, 80+80 MHz, 240 MHz, 160+80 MHz (or 80+160 MHz), 80+80+80 MHz (or 3×80 MHz), 320 MHz, 160+160 MHz (or 2×160 MHz), 160+80+80 MHz (or 160+2×80 MHz), or 80+80+80+80 MHz (or 4×80 MHz). The entire PPDU BW tone plan may not be suitable in the channel bonding cases discussed above. For example, null SBs may not be aligned to physical 20 MHz boundaries and RU boundaries in unmodified tone plans can result in insufficient inter-channel interference mitigation.

Referring back to FIG. 6C, a plurality of physical 20 MHz SBs 681-684 and associated boundaries are shown. Although the illustrated transmission 600C is an 80 MHz transmission, the teachings herein can also be applied to 40 MHz transmissions, 160 MHz transmissions, 80+80 MHz transmissions (which, for example, can include two duplicated 80 MHz transmissions), 160+160 MHz transmissions, 320 MHz transmissions, 4×80 MHz transmissions (which, for example, can include two duplicated 160 MHz transmissions).

As shown in FIG. 6C, the first 242-tone block 685 is shifted 2 tones away from a boundary 680 of a first physical 20 MHz SB 681. The second 242-tone block 686 includes 2 tones crossing the 20 MHz boundary 680. Accordingly, in implementations where the first physical 20 MHz SB 681 is a null SB and 3 additional left guard tones are specified, the 2 overlapping tones, plus 3 left guard tones equals 5 total tones 691, which can be referred to as impacted tones. Such impacted tones can overlap with a null SB, or a guard band thereof. Similarly, because the second 242-tone block 686 includes impacted tones, it can be referred to as an impacted RU. Moreover, where the second 20 MHz SB 682 is a null SB, the entire second 242-tone block 686 can be impacted (240 overlapping tones, plus 2 right edge tones).

The 7 DC tones can be split into 3+4 tones across a 20 MHz boundary and can serve as guard bands to the 20 MHz boundary in some implementations. The third 242-tone block 687 includes 3 tones crossing a 20 MHz boundary 690, so assuming 2 right guard tones there are a total of 5 impacted tones 692 when the fourth physical 20 MHz SB 684 is null (and also 698). The fourth 242-tone block 688 is 3 tones away from the 20 MHz boundary 690. Although the foregoing description refers to the 242-tone blocks 685-688, the 26-, 56-, and 106-tone blocks can be impacted in the same way (and different tones of the same RU can be impacted with respect to different PHY 20 MHz SBs). For example, the 106-tone block 695 (and others) can include at least 4 impacted tones 693 with respect to the first physical 2.0 MHz SB 681 and all tones can be impacted with respect to the second physical 20 MHz SB 682, and so forth. Moreover, in implementations where the number of guard tones is lower or higher, greater or fewer total tones can be impacted, respectively.

Independent PPDUs for Non-Contiguous Channels

FIG. 7 shows an example of RU subcarrier indices. The RU subcarrier indices as shown in FIG. 7 may correspond to the 160 MHz and 320 MHz 4× symbol duration tone plans described herein (also labeled in reference to a 160 MHz Option and a 320 MHz Option). For example, the 160 MHz tone plan described in relation to the 160 MHz Option may have RU sizes of 26, 52, 106, 242, 484, and 996 tones. The subcarrier indices in the lower 80 MHz SB may be reduced by 512 while the subcarrier indices in the upper 80 MHz SB may be increased by 512. For example, the 80 MHz tone plan may use an index range of [−512, 511] and may have 1024-point. The 160 MHz tone plan may duplicate two 80 MHz tone plans. Thus, the lower half of the 160 MHz tone play may use an index range of [−1024, −1], which comes from the 80 MHz tone plan index range minus 512 (for example, [−512, 511]−512)=[−1024, −1]. The upper half may use a range of [0, 1024], which comes from the 80 MHz tone plan index range plus 512 (for example, [−512, 511]+ 512=[0, 1023]. By referring to how the indices are related, the RU boundaries, null tones, pilot tones, etc. in 160 MHz, may be described based on or in reference to the 80 MHz.

The 320 MHz tone plan described in relation to the 320 MHz Option may also have RU sizes of 26, 52, 106, 242, 484, and 996 tones. The subcarrier indices in the lowest 80 MHz SB may be reduced by 1536 while the subcarrier indices in the second lowest 80 MHz SB are reduced by 512. The subcarrier indices in the second highest 80 MHz SB may be increased by 512, while the subcarrier indices of the highest 80 MHz SB may be increased by 1536.

Figure 8:
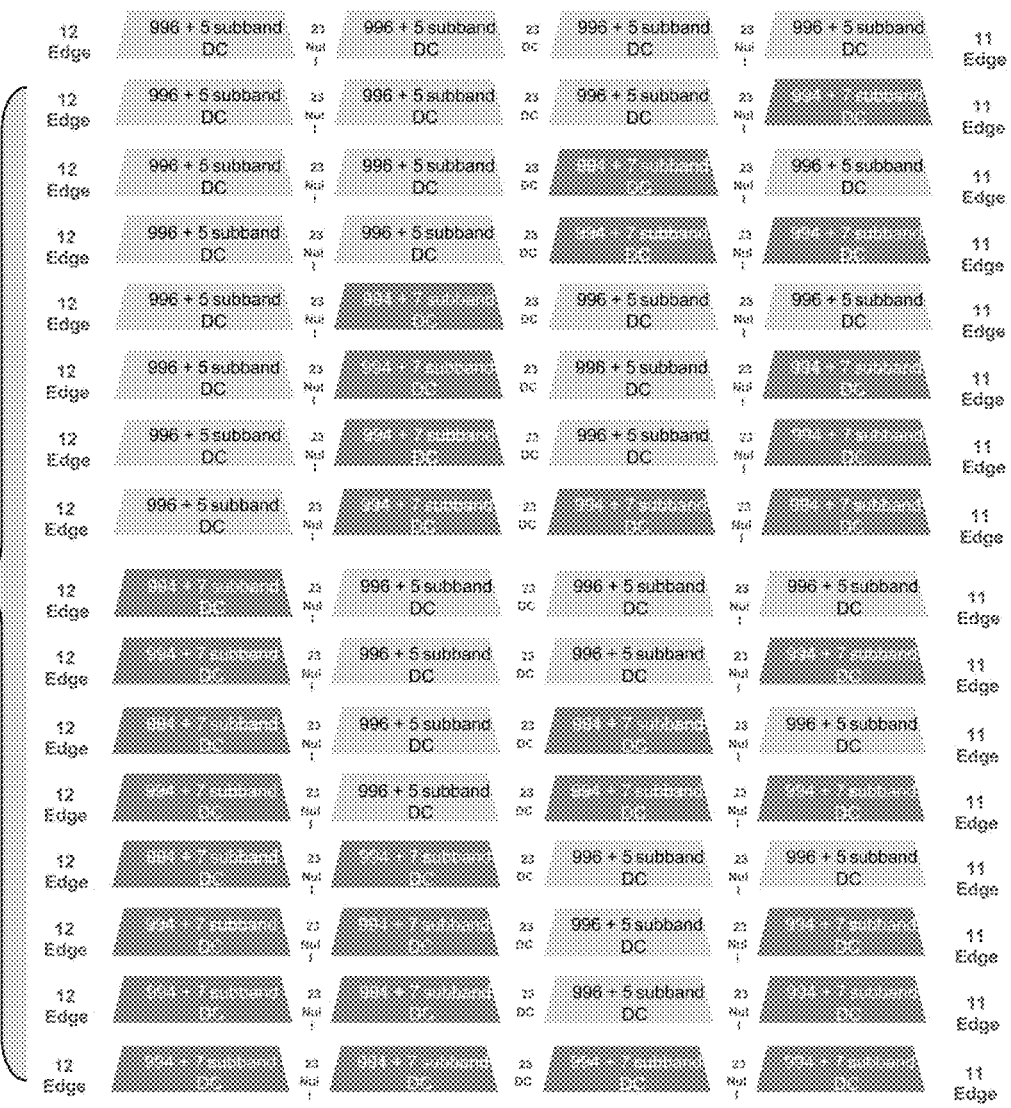
FIG. 8 shows an example 4× 320 MHz tone plan proposal using duplicates of 2 HE160 or duplicates of 4 HE80 tone plans.

FIG. 8 shows an example 4× 320 MHz tone plan proposal using duplicates of 2 HE160 or duplicates of 4 HE80 tone plans.

In some aspects, the selected 4× tone plan may be selected independent of a hardware implementation and regardless of bandwidth mode (for example, 320 MHz vs. 4×80 MHz, or 160+80 MHz vs. 3×80 MHz).

Figure 9A:
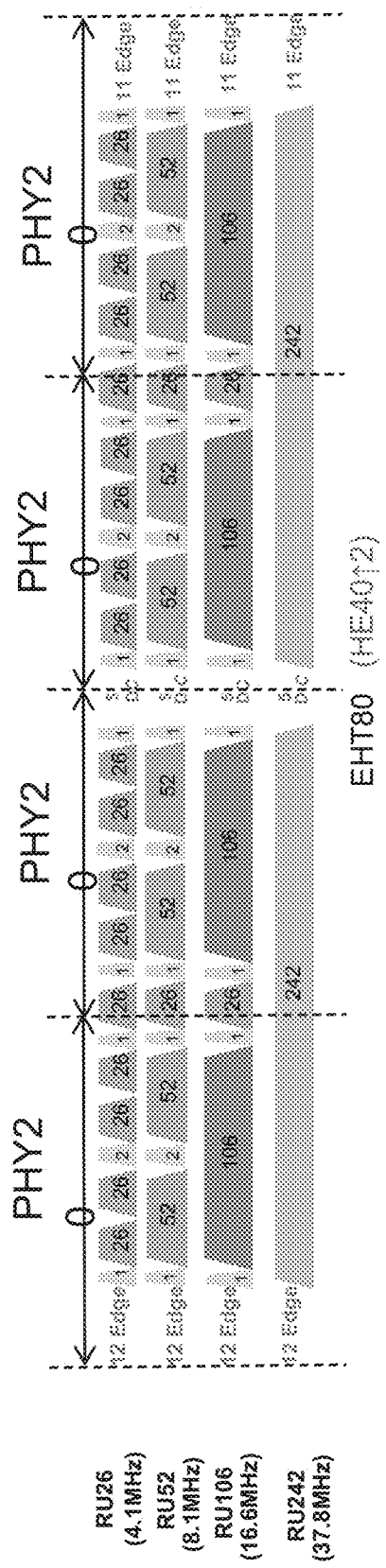
FIGS. 9A-9C show examples of RU subcarrier indices.
Figure 9B:
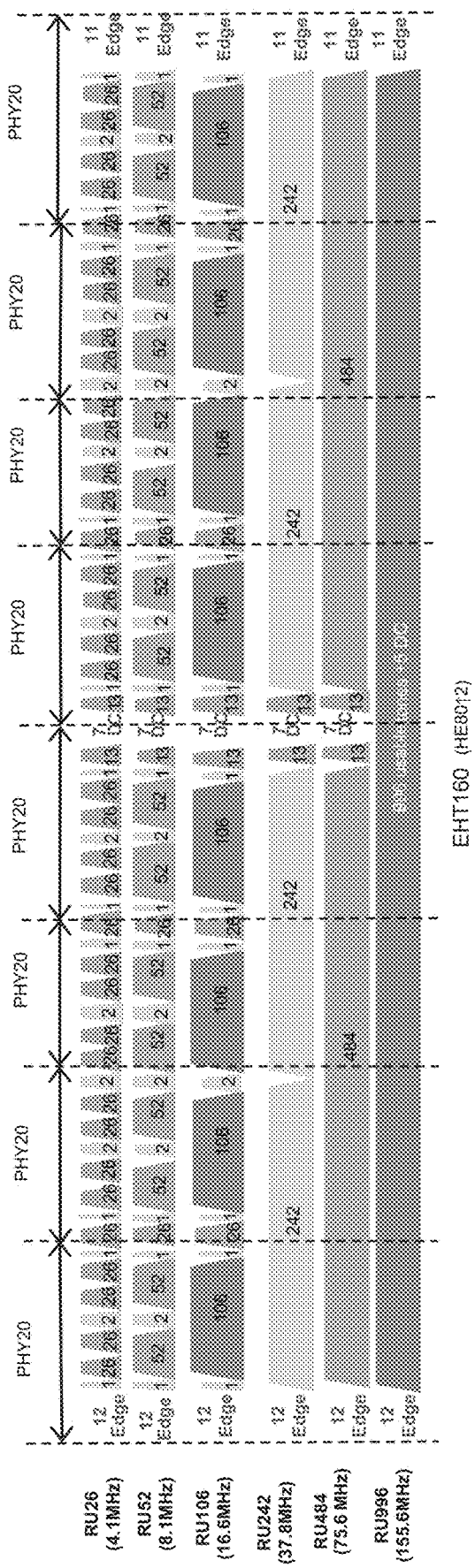
Figure 9C:
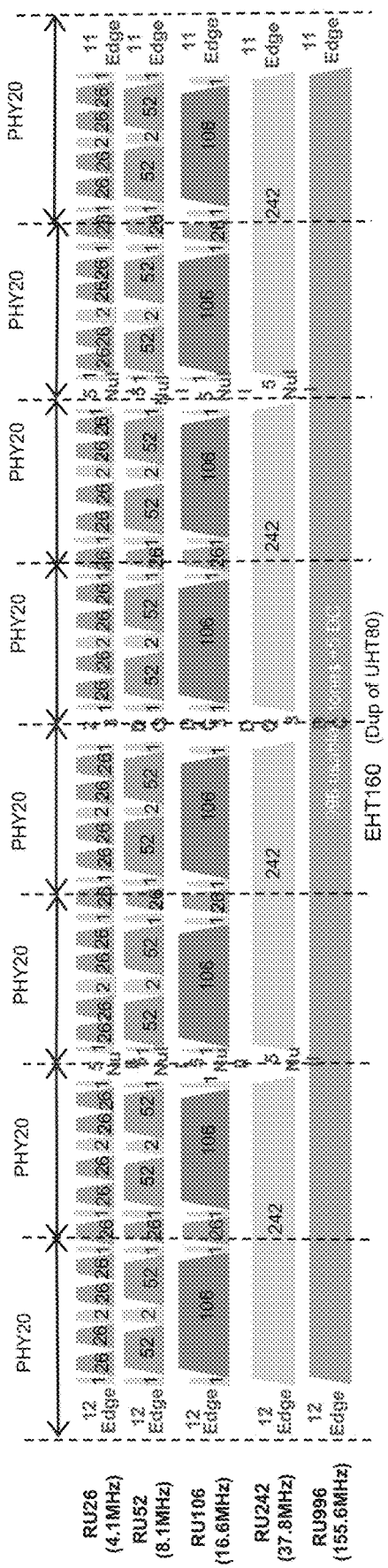

FIGS. 9A-9C show examples of RU subcarrier indices.

FIG. 9A shows 26-tone, 52-tone, 106-tone, and 242-tone RUs tone plans for an extremely high throughput (EHT) 80 (2× Option 1). The tone plan is formed by the HE40 SU or OFDMA tone plan upclocking by 2. The 26-tone RU tone plan has a granularity of ~4.1 MHz. As shown, the 26-tone RUs are separated by various quantities of null tones (for example, 1 null tone and/or 2 null tones) with a 12 left+11 right guard tone configuration and a 5-tone DC. The 52-tone RU tone plan has a granularity of ~8.1 MHz. As shown, the 52-tone RUs are separated by various amounts of null tones (for example, 1 and/or 2 null tones) with a 12 left+11 right guard tone configuration and a 5-tone DC. The 106-tone RU tone plan has a granularity of ~16.6 MHz. As shown, the 106-tone RUs are separated by 1 null tone with a 12 left+11 right guard tone configuration and a 5-tone DC. The 1 null tone may separate the 106-tone RUs from the edge tones, from 26-tone RUs, and from the 5-tone DC. The 242-tone RU tone plan has a granularity of 37.8 MHz. As shown, the 242-tone RUs have a 12 left+11 right guard tone configuration and a 5-tone DC. In such aspects, the minimum frequency chunk for preamble puncturing for these tone plans is PHY 20 MHz. As noted herein, since the $5^{th}$ and $14^{th}$ 26-tone RUs cross the PHY 20 MHz boundary, these RUs may be disabled if preamble puncturing is used.

The EHT160 tone plan and the EHT320 tone plan may be based on the HE80 and HE160 tones plans, respectively, each upclocked by 2 (2× Option 2A). FIG. 9B shows 26-tone, 52-tone, 106-tone, 242-tone, 484-tone, and 996-tone RUs tone plans for the 2×EHT160/EHT320 by HE80/HE160 upclocking by 2 (2× Option 2A). The 26-tone RU tone plan has a granularity of ~4.1 MHz. As shown, the 26-tone RUs are separated by 1 and/or 2 null tones with a 12 left+11 right guard tone configuration and a 7-tone DC with 13-tone RUs on either side of the 7-tone DC. The 52-tone RU tone plan has a granularity of ~8.1 MHz. As shown, the 52-tone RUs are separated by 1 and/or 2 null tones with a 12 left+11 right guard tone configuration and a 7-tone DC with 13-tone RUs on either side of the 7-tone DC. The 106-tone RU tone plan has a granularity of 16.6 MHz. As shown, the 106-tone RUs are separated by 1 and/or 2 null tones with a 12 left+11 right guard tone configuration and a 7-tone DC with 13-tone RUs on either side of the 7-tone DC. The 242-tone RU tone plan has a granularity of 37.8 MHz. As shown, the 242-tone RUs has a 12 left+11 right guard tone configuration and a 7-tone DC with 13-tone RUs on either side of the 7-tone DC. As shown, the 484-tone RUs have a 12 left+11 right guard tone configuration and a 7-tone DC with 13-tone RUs on either side of the 7-tone DC with 13-tone RUs on either side of the 7-tone DC. As shown, the 996-tone RU is one single 996-tone RU with a 12 left+11 right guard tone configuration and no DC. No preamble puncturing (for example, alignment) may occur at PHY 20 MHz chunks because these tone plans are not preamble puncturing friendly. For example, with PHY 20 MHz chunks, various tones cross the 20 MHz boundaries, including the $5^{th}$ 26-tone RU, the $10^{th}$ 26-tone RU, the $5^{th}$ 52-tone RU, the $3^{rd}$ 106-tone RU, the $14^{th}$ 26-tone RU, the $24^{th}$ 26-tone RU, the $28^{th}$ 26-tone RU, the $12^{th}$ 52-tone RU, the $6^{th}$ 106-tone RU, and the $33^{rd}$ 26-tone RU. Each of these RUs may have different numbers of tones that cross the respective 20 MHz boundaries.

Alternatively, the EHT160 and EHT320 tone plans may be based on duplications of two and four EHT80 tone plans, respectively (2× Option 2B). FIG. 9C shows 26-tone, 52-tone, 106-tone, 242-tone, and 996-tone RUs tone plans for the 2× EHT160/EHT320 using duplications of 2/4 EHT80 tone plans (2× Option 2B). The 26-tone RU tone plan has a granularity of ~4.1 MHz. As shown, the 26-tone RUs are separated by 1 and/or 2 null tones with a 12 left+11 right guard tone configuration, a 23-tone DC separating the $4^{th}$ and $5^{th}$ PHY20 blocks, and 5 null tones separating the $2^{nd}$ and $3^{rd}$ PHY20 blocks and the $6^{th}$ and $7^{th}$ PHY20 blocks. The 52-tone RU tone plan has a granularity of ~8.1 MHz. As shown, the 52-tone RUs are separated by 1 and/or 2 null tones with a 12 left+11 right guard tone configuration, a 23-tone DC separating the $4^{th}$ and $5^{th}$ PHY20 blocks, and 5 null tones separating the $2^{nd}$ and $3^{rd}$ PHY20 blocks and the $6^{th}$ and $7^{th}$ PHY20 blocks. The 106-tone RU tone plan has a granularity of 16.6 MHz. As shown, the 106-tone RUs are separated by 26-tone RUs and 1 null tone with a 12 left+11 right guard tone configuration, a 23-tone DC separating the $4^{th}$ and $5^{th}$ PHY20 blocks, and 5 null tones separating the $2^{nd}$ and $3^{rd}$ PHY20 blocks and the $6^{th}$ and $7^{th}$ PHY20 blocks. The 242-tone RU tone plan has a granularity of ~37.8 MHz. As shown, the 242-tone RUs are separated by 5 null tones with a 12 left+11 right guard tone configuration and a 23-tone DC. As shown, the 996-tone RU is one single 996-tone RU with a 12 left+11 right guard tone configuration and no DC. PHY 20 MHz boundary alignment for preamble puncturing may be accomplished by disabling the $5^{th}$, $14^{th}$, $23^{rd}$, and $32^{nd}$ 26-tone RUs with only a slightly lowered efficiency as compared to 2× Option 2A.

In the EHT bandwidths (for example, the 240 MHz and/or 320 MHz BWs), communications may be coded using binary convolutional code (BCC) or low-density parity check (LDPC) coding. In some implementations, BCC coding may be used in 26-, 52-. 106, or 242-tone RUs. In some implementations, LDPC coding may be used in all RU sizes in the 240 MHz and/or 320 MHz BWs. In some implementations, 2× or 4× symbol durations may be used for data communications coded in EHT transmissions within the 240 and/or 320 MHz BWs.

BCC coding may utilize a BCC interleaver. The BCC interleaver may interleave bits in each spatial stream (for example, changing an order of bits) to prevent n-length sequences of adjacent noisy bits from entering a BCC decoder, where n is a predetermined value. Interleaving may only be applied when BCC encoding is used. In EHT communications, the BCC interleaver may be designed to accommodate RUs having sizes up to 242 tones.

LDPC coding may utilize an LDPC tone mapper that may operate to code communications to combat frequency selective fading and a segment parser that may divide the BW into one or more segments. The LDPC tone mapper may utilize dual subcarrier modulation (DCM) and corresponding tone mapping distances. In some implementations, the BCC interleaver, the LDPC tone mapper, and/or the LDPC segment parser may be configured to operate when puncturing exists in the BW.

Puncturing may exist due to occupancy of certain channels or sub-bands by neighboring BSSs, occupancy of certain channels or sub-bands by incumbent technologies, etc. In one or more bandwidth modes, the puncturing may make at least a portion of the BW unavailable for transmission or communication. In some implementations, the puncturing may be based on multiples of a predetermined BW, such as 20 MHz or based on RU size. In some implementations, when one or more sub-bands of the BW are punctured, the selected tone plan may be based on available (for example, not punctured) RUs.

In some implementations, for bandwidths or sub-bands of 160 MHz or below (for example, 80+80 MHz, etc.), a processor may utilize the BCC interleaver and/or the LDPC tone mapper and segment parser for coding transmissions according to 4× symbol duration tone plans. In some implementations, for BWs and sub-bands within BWs of 240 or 320 MHz, the processor may utilize the BCC interleaver and/or LDPC tone mapper and segment parser for coding transmissions according to 2× or 4× symbol duration tone plans. For example, with a total BW of 240 or 320 MHz, tone plans may be designed for generating transmission signals in each of contiguous frequency sub-bands sizes of 80, 160, and 320 MHz. When the tone plans are 4× symbol duration tone plans, the 80 and 160 MHz sub-bands may use HE80/HE160 tone plans, respectively. When the tone plans are 4× symbol duration tone plans, the 240 and 320 MHz sub-bands may use duplicate HE80 tone plans (3 duplicated HE80 tones plans for 240 MHz and 4 duplicated HE80 tone plans for 320 MHz). When the tone plans are 2× symbol duration tone plans, the 80 MHz sub-band may use a HE40 tone plan that is upclocked by 2. When the tone plans are 2× symbol duration tone plans, the 160 and 320 MHz sub-bands may have multiple options for tone plans.

As a first EHT option, the 160 and 320 MHz sub-bands may use HE80 and HE160 tone plans upclocked by 2, respectively. As a second EHT option, the 160 and 320 MHz sub-bands may be duplicates of two and four EHT 80 MHz sub-band tone plans, respectively. When the tone plans are 2× symbol duration tone plans, the 240 MHz sub-band may comprise [HE40 HE80] tone plans upclocked by 2 when the 240 MHz BW is divided into 80+160 MHz sub-bands, [HE80 HE40] tone plans upclocked by 2 when divided into 160+80 MHz sub-bands, or [HE40 HE40 HE40] tone plans upclocked by 2 when divided into 80+80+80 MHz sub-bands.

The various sub-bands in the 240 and 320 MHz may utilize various RU sizes for coded transmissions. In some implementations, some of the RU sizes for each of the sub-bands may overlap with RU sizes from other sub-bands. For example, for 160 MHz and smaller sub-bands, coded transmissions may utilize RU sizes of 26, 52, 106, 242, 484, 996, and/or 2×996 tones, regardless of the symbol duration of the tone plans. For higher BW sub-bands (for example, 240 or 320 MHz), coded transmissions may utilize RU sizes that are dependent on the symbol duration of the tone plan being implemented. For example, for 4× symbol duration tone plans, the RU sizes for coded transmissions may include 26, 52, 106, 242, 484, 996, and 2×996 tones, which match the RU sizes for the 160 MHz and smaller sub-bands. However, the 4× symbol duration tone plans may also utilize RU sizes of 3×996 (for example, for an SU in total 240 MHz transmissions or OFDMA in total 320 MHz transmission) and 4×996 tones (for example, for an SU in total 320 MHz transmission). Alternatively, or additionally, for 2× symbol duration tone plans, the RU sizes used for coded transmissions may include 26, 52, 106, 242, 484 (for example, for OFDMA in a 80 MHz sub-band in total 240 or 320 MHz BWs), 996 (for example, for OFDMA in a 160 MHz sub-band in total 240 or 320 MHz BWs of the second EHT option above), or 2×996 (for example, for SU in total 320 MHz BW of the second EHT option). Furthermore, the 2× symbol duration tone plans may also utilize RU sizes of 2×484 (for example, for OFDMA in a 160 MHz sub-band of the first EHT option above), 3×484 (for example, for SU in total 240 MHz BW for first EHT option, OFDMA in a 240 MHz sub-band in total 320 MHz BW of the first EHT option, or OFDMA in combined 4×80 MHz sub-bands in a total 240 MHz BW), 4×484 (for example, for SU in total 320 MHz BW of the first EHT option or SU in 4×80 MHz sub-bands of the total 240 MHz BW in the second EHT option), 484+996 (for example, for SU in a 80+160 MHz sub-band in the second EHT option or OFDMA in a 240 MHz sub-band in the total 320 MHz BW in the second EHT option), or 2×484+996 (for example, for SU in a 2×80+160 MHz sub-band in the second EHT option).

The interleaving used for the corresponding RUs may be dependent on the RU sizes. For example, RU sizes of 26, 52, 106, 242, 484, 996, and 2×996 tones may utilize interleaving parameters for tone plans applicable under or useful for 802.11ax for the BCC interleavers, the LDPC tone mappers, and the segment parser for coding transmissions in total BWs less than and equal to 160 MHz (including 80+80 MHz sub-bands), and in 2× or 4× symbol duration tone plans in 240 or 320 MHz total BWs, regardless of whether or not puncturing exists in one or more sub-bands of the total BW.

For RU sizes used in the 240 and 320 MHz BWs (for example, the RUs of 3×996, 4×996, 2×484, 3×484, 4×484, 484+996, or 2×484+996), or where puncturing exists in at least one sub-band of the total BW, the total BW may be divided or segmented into a plurality of segments. In some implementations, the segmentation may be dependent on an availability of channel frequency bands. The interleaving in the 240 or 320 MHz BWs may utilize the segment parser to divide the BW into segments and RU based interleaving using the B3CC interleaver and/or LDPC tone mappers. For example, the segment parser may parse bits into different segments and then apply the BCC interleaver and/or the LDPC tone mapper for all data tones within each segment. In some implementations, the total BW may be segmented into 2, 3, or 4 segments and one or more of the segments may include puncturing of at least a portion of a bandwidth covered by the segment.

In some implementations, interleaving using the BCC interleaver and/or the LDPC tone mappers may be dependent on sizes of the segments. In some implementations, the total BW may be segmented into segments that are each multiples of 20 MHz (for example, 4×80 MHz for a total 320 MHz BW or 160+2×80 MHz for a total 320 MHz BW). In some implementations, the total BW may be segmented based on grouping of RUs in the tone plan, for example, when there is puncturing. For example, in the 4×996 tone plan in the 320 MHz BW (where each of 4 segments is 996 tones) in the 4× symbol duration tone plan, each "group" of tones may include 996 tones such that there are 4 groups. In the 2×484+996 tone plan in the 320 MHz BW (where two segments are 484 tones and 1 segment is 996 tones) in the 2× symbol duration tone plan, two groups may include 484 tones and the third group may include 996 tones. Accordingly, in some implementations, each segment may include the same number of data tones (for example, in the 4×996 tones plans) or different numbers of data tones (for example, caused by the different segment sizes in the 2×484±996 tone plans or due to puncturing within the one or more segments, such as in the 2×160 MHz tone plan where the first 160 MHz sub-band has a 20 MHz punctured or a few RUs are punctured).

The segment parser may operate in various modes. For example, when all segments generated by the segment parser are of equal size or when any puncturing within the BW results in each of the segments having an equal number of data tones, the segment parser may operate as a same size segment parser. For example, the same size segment parser may operate in 160+160 MHz sub-bands in the total 320 MHz BW with a 4× symbol duration tone plan (such as the 4×996 tone plan) where there are 980 data tones in each of 4 segments. Similarly, the same size segment parser may operate in 4×80 MHz sub-bands in the total 320 MHz BW with a 4× symbol duration tone plan (such as the 4×996 tone plan) having puncturing of 40 MHz for each 80 MHz segment, where there are an equal number of data tones in each of the 40 MHz unpunctured sub-bands for each of the 4 segments.

In some implementations, either the same size or the different size segment parser may apply when the sub-bands are not equal but when puncturing makes the available sub-bands or number of tones equal in the unequal sub-bands.

In some implementations, the same size segment parser may operate in a first segment parser mode where the segment parser evenly parses bits into each segment. For example, the segment parser may parse groups of bits into each segment according to a 1:1 ratio between each segment (such as 1:1 in a two segment BW, 1:1:1 in a three segment BW, 1:1:1:1 in a four segment BW, and so forth). In some implementations, the same size segment parser operating in the first segment parser mode may implement an equal segment parser algorithm.

In some implementations, the same size segment parser may operate in a second segment parser mode where the segment parser may sequentially parse bits into each segment. In some implementations, the same size segment parser operating in the second segment parser mode may implement a sequential parser algorithm, which is described in additional detail herein.

When all segments generated by the segment parser are not of equal size or when any puncturing within the BW results in any one of the segments having a different number of data tones from any one other segment, the segment parser may operate as a different size segment parser. For example, the different size segment parser may operate in SU 2×80+160 MHz sub-bands in the total 320 MHz BW in the second EHT option, where there are 2×468+980 data tones in 3 segments, or 4×80 MHz with a 4× symbol duration tone plan, where one of the 4 segments is punctured with, for example, a 40 MHz puncture. The different size segment parser may operate in a third segment parser mode, where the different size segment parser parses groups of bits into the segments according to a ratio until the segment having the smallest size or number of available data tones is filled, and then sequentially parsing the remaining bits into each remaining segment until all remaining segments are filled. In some implementations, the different size segment parser operating in the third segment parser mode may implement an unequal segment parser algorithm.

In some implementations, the unequal segment parser algorithm may be ratio based. In some implementations, the different size segment parser may operate in a fourth segment parser mode, where the different size segment parser parses bits into the segments in a sequential manner until all segments are filled. In some implementations, the different size segment parser operating in the fourth segment parser mode may implement the sequential parser algorithm.

The equal segment parser algorithm may comprise, for $N_{seg}$ equal segments, dividing bits to be output by each stream parser of the equal segment parser into blocks of $N_{CBPSS}$ bits (or $N_{CBPSS,u}$ bits in a multi-user (MU) transmission), where:

$N_{CBPSS}=N_{SD}*N_{BPSSC}$, where $N_{CBPSS}$ is a number of coded bits per symbol per spatial stream;

$N_{SD}=N_{seg}*N_{SD,seg}$, where $N_{SD}$ is the number of coded bits per symbol per spatial stream per segment; and $N_{BPSSC}$ is a modulation order.

The equal segment parser algorithm may then comprise dividing each of those blocks of $N_{CBPSS}$ bits into $N_{seg}$ frequency subblocks of $$\frac{N_{CBPSS}}{N_{seg}}$$

bits according to $y_{k,l}=x_m$, where $y_{k,l}$ is an output bit k of the frequency subblock l and $x_m$ is an input bit in of a block of $N_{CBPSS}$ bits, and:

$$m = N_{seg}*s*\left[\frac{k}{s}\right]+l*s+\text{mod}(k,s);$$

where $s=\text{floor}(N_{BPSSC}/2)$;
k=0, 1, . . . , $$\frac{N_{CBPSS}}{N_{seg}}-1,$$

where k is a bit index in each segment; and
l=0, 1, . . . , $N_{seg}-1$, where l is a segment index.

In some implementations, the equal segment parser algorithm may be implemented by the same size segment parser operating in the first segment parser mode.

The sequential segment parser algorithm may comprise, for $N_{seg}$ equal or unequal segments, dividing bits to be output by each stream parser of the sequential segment parser into blocks of $N_{CBPSS}$ bits (or $N_{CBPSS,u}$ bits in an MU transmission), where:

$N_{CBPSS}=N_{SD}*N_{BPSSC}$, where $N_{CBPSS}$ is a number of coded bits per symbol per spatial stream;

$N_{SD}=\Sigma_{l=0}^{N_{seg}-1}N_{SD,l}$, where $N_{SD,l}$ is the number of coded bits per symbol per spatial stream in the l-th segment; and $N_{BPSSC}$ is a modulation order.

The sequential segment parser algorithm may then comprise dividing each of those blocks of $N_{CBPSS}$ bits into $N_{seg}$ frequency subblocks according to $y_{k,l}=x_m$, where $y_{k,l}$ is an output bit k of the frequency subblock l and $x_m$ is an input bit m of a block of $N_{CBPSS}$ bits, and:

$m=(\Sigma_{p=0}^{l-1}N_{SD,p})*N_{BPSSC}+k$;

k=0, 1, . . . , $N_{SD,l}*N_{BPSSC}-1$, where k is a bit index in each segment; and l=0, 1, . . . , $N_{seg}-1$, where l is a segment index.

In some implementations, the sequential parser algorithm may be implemented by the same size segment parser operating in the second segment parser mode or the different size segment parser operating in the fourth segment parser mode.

The unequal segment parser algorithm may comprise, for $N_{seg}$ unequal segments and where the parsing ratio for the unequal segments is 1:1 between each pair of segments, dividing bits to be output by each stream parser of the sequential segment parser into blocks of $N_{CBPSS}$ bits (or $N_{CBPSS,u}$ bits in an MU transmission), where:

$N_{CBPSS}=N_{SD}*N_{BPSSC}$, where $N_{CBPSS}$ is a number of coded bits per symbol per spatial stream;

$N_{SD}=\Sigma_{l=0}^{N_{seg}-1}$, where $N_{SD,l}$ is the number of coded bits per symbol per spatial stream in the l-th segment;

$N_{BPSSC}$ is a modulation order, and

Assuming that the segment with the largest number of tones (for example segment 3 is a 996-tone segment) is the last segment with index $N_{seg}-1$ and that the first $N_{seg}-1$ segments have equal sizes (for example segments 1 and 2 are 484-tone segments).

The unequal segment parser algorithm may then comprise dividing each of those blocks of $N_{CBPSS}$ bits into $N_{seg}$ frequency subblocks according to $y_{k,l}=x_m$, where $y_{k,l}$ is an output bit k of the frequency subblock l and $x_m$ is an input bit m of a block of $N_{CBPSS}$ bits, and:

$$m = N_{seg}*s*\left[\frac{k}{s}\right]+l*s+\text{mod}(k,s);$$

where $s=\text{floor}(N_{BPSSC}/2)$;
k=0, 1, . . . , $N_{SD,0}*N_{BPSSC}-1$, where k is a bit index in the l-th segment;
l=0, 1, . . . , $N_{seg}-1$, where l is a segment index;
$m=(N_{seg}-1)*N_{SD}*N_{BPSSC}+k$;
k=$N_{SD,0}*N_{BPSSC}$,$N_{SD,0}*N_{BPSSC}+1$, . . . , $N_{SD,N_{seq}-1}*N_{BPSSC}-1$;
l=$N_{seg}-1$.

The unequal segment parser algorithm may comprise, for unequal segments and where the parsing ratio for the unequal segments is 1:1 between each pair of segments and where the segments are generally unequal, dividing bits to be output by each stream parser of the sequential segment parser into blocks of $N_{CBPSS}$ bits (or $N_{CBPSS,u}$ bits in an MU transmission), where:

$N_{CBPSS}=N_{SD}*N_{BPSSC}$, where $N_{CBPSS}$ is a number of coded bits per symbol per spatial stream;

$N_{SD}=\Sigma_{l=0}^{N_{seg}-1}N_{SD,l}$, where $N_{SD,l}$ is the number of coded bits per symbol per spatial stream in the l-th segment, $N_{BPSSC}$ is a modulation order; and Assuming that $N_{SD,0} \leq N_{SD,1} \leq \ldots \leq N_{SD,N_{seg}-1}$, without loss of generality and for simplicity of description.

The unequal segment parser algorithm may then comprise dividing each of those blocks of $N_{CBPSS}$ bits into $N_{seg}$ frequency subblocks according to $y_{k,l}=x_m$, where $y_{k,l}$ is an output bit k of the frequency subblock l and $x_m$ is an input bit m of a block of $N_{CBPSS}$ bits, and:

$$m = N_{seg} * s * \left\lfloor \frac{k}{s} \right\rfloor + l * s + \mathrm{mod}(k, s);$$

where $s = \mathrm{floor}(N_{BPSSC}/2)$;
  $k = 0, 1, \ldots, N_{SD,0} * N_{BPSSC} - 1$, where k is a bit index in the l-th segment;
  $l = 0, 1, \ldots, N_{seg} - 1$, where l is a segment index;
  $m = (N_{seg} - 1) * N_{SD} * N_{BPSSC} + \Sigma_{j=1}^{i-1}(N_{SD,j} - N_{SD,0}) * N_{BPSSC} + k$;
  $k = N_{SD,0} * N_{BPSSC}, N_{SD,0} * N_{BPSSC} + 1, \ldots, N_{SD,i} * N_{BPSSC} - 1$;
  $l = 1, \ldots, N_{seg} - 1$.

The unequal segment parser algorithm may comprise, for $N_{seg}$ unequal segments and where the parsing ratio for the unequal segments is 1:2 or 1:1:2, and so forth, between segments, dividing bits to be output by each stream parser of the sequential segment parser into blocks of $N_{CBPSS}$ bits (or $N_{CBPSS,u}$ bits in an MU transmission), where:
  $N_{CBPSS} = N_{SD} * N_{BPSSC}$, where $N_{CBPSS}$ is a number of coded bits per symbol per spatial stream;
  $N_{SD} = \Sigma_{l=0}^{N_{seg}-1} N_{SD,l}$, where $N_{SD,l}$ is the number of coded bits per symbol per spatial stream in the l-th segment;
  $N_{BPSSC}$ is a modulation order; and
  Assuming that the segment with the largest number of tones (for example segment 3 is a 996-tone segment) is the last segment with index $N_{seg} - 1$ and that the first $N_{seg} - 1$ segments have equal sizes (for example segments 1 and 2 are 484-tone segments).

The unequal segment parser algorithm may then comprise dividing each of those blocks of $N_{CBPSS}$ bits into $N_{seg}$ frequency subblocks according to $y_{k,l} = x_m$, where $y_{k,l}$ is an output bit k of the frequency subblock l and $x_m$ is an input bit m of a block of $N_{CBPSS}$ bits, and:

$$m = (N_{seg} + 1) * s * \left\lfloor \frac{k}{s} \right\rfloor + l * s + \mathrm{mod}(k, s);$$

where $s = \mathrm{floor}(N_{BPSSC}/2)$;
  $k = 0, 1, \ldots, N_{SD,0} * N_{BPSSC} - 1$, where k is a bit index in the l-th segment;
  $l = 0, 1, \ldots, N_{seg} - 2$, where l is a segment index for the $N_{seg} - 1$ segments;

$$m = (N_{seg} + 1) * s * \left\lfloor \frac{k}{2 * s} \right\rfloor + (N_{seg} - 1 + \mathrm{mod}(k, s)) * s;$$

$k = 0, 1, \ldots, 2 * N_{SD,0} * N_{BPSSC} - 1$, where k is a bit index for the l-th segment;
  $l = N_{seg} - 1$, where l is the segment index for the last segment
  $m = (N_{seg} - 1) * N_{SD,0} * N_{BPSSC} + k$;
  $k = 2 * N_{SD,0} * N_{BPSSC}, 2 * N_{SD,0} * N_{BPSCC} + 1, \ldots, N_{SD,N_{seg}-1} * N - 1$, where k is a bit index for the last segment; and
  $l = N_{seg} - 1$, where l is the segment index.

In some implementations, the unequal segment parser algorithm may be implemented by the different size segment parser operating in the third segment parser mode (for example, when the ratio for parsing is 1:1 or 1:1:1), the different size segment parser operating in the third segment parser mode with generally unequal segments (for example, when the ratio for parsing is 1:1 or 1:1:1), or the different size segment parser operating in the third segment parser mode with unequal parsing ratios (for example, when the ratio for parsing is 1:2 or 1:1:2).

FIG. 10 shows a table 1000 depicting various example segment parser designs based on RU sizes, numbers of data tones, and segmentation of transmissions on the 240 and 320 MHz bandwidths. The table 1000 includes four columns, where the first column identifies a number of and configuration of the segments in the BW, the second column identifies RU sizes used for the configuration of segments, the third column identifies the number of data tones in the configuration of segments with given RU sizes, and the fourth column identifies details of how the corresponding segment parser will function in the given configuration. The information shown in the table 1000 may apply to implementations where none of the segments are punctured and where 484-tone segment(s) and 996-tone segment(s) are examples for the 4× and 2× tone plans, respectively. In some implementations, as shown in table 1000, the 484-tone segments have 468 data tones and 16 pilot tones, and the 996-tone segments have 480 data tones and 16 pilot tones.

As shown in table 1000, in some implementations, when the BW is segmented into 2, 3, or 4 equal segments that each utilize the same size RU and same number of data tones (for example, 484-tone or 996-tone RUs and 468 or 980 data tones), the same size segment parser may operate in the first segment parser mode and use equal parsing (with a ratio of 1:1, 1:1:1, or 1:1:1:1) of every s bits, where: $s = \mathrm{floor}(N_{BPSSC}/2)$ and where $N_{BPSSC}$ is the modulation order. In some implementations, when the BW is segmented into 2, 3, or 4 equal segments that each utilize the same size RU and same number of data tones, the same size segment parser may operate in the second segment parser mode and sequentially parse bits to each segment.

As shown in table 1000, in some implementations, when the BW is segmented into different sized segments that utilize different sized RUs and/or have different sized data tones, the different size segment parser may operate in the third segment parser mode and use equal parsing (with a ratio of 1:1 or 1:1:1) of every s bits until the smallest segments (for example, the 484-tone segments) are filled, and then parse the remaining bits into the 996-tone segment sequentially until the 996-tone segment is filled. In some implementations when the BW is segmented into different sized segments that utilize different sized RUs and/or have different sized data tones, the different size segment parser may operate in the third segment parser mode and use unequal parsing (with a ratio of 1:2 or 1:1:2) of every s bits until the smallest segments (for example, the 484-tone segments) are filled, and then parse the remaining bits into the 996-tone segment sequentially until the 996-tone segment is filled. In some implementations, when the BW is segmented into different sized segments that utilize different sized RUs and/or have different sized data tones, the different size segment parser may operate in the fourth segment parser mode and sequentially parse bits into each segment until all segments are filled.

FIG. 11 shows a table 1100 depicting various example tone mapper design features based on RU sizes, numbers of data tones, a total number of data tones, and divisors of the total number of data tones for the 240 and 320 MHz bandwidths. The table 1100 includes five columns, where the first column identifies an RU size, the second column identifies the number of data tones in the RU sizes of the first column, the third column identifies a total number of data tones (for example, N_SD_total) in the total BW having the RU and data tone configuration of the first and second columns, the fourth column identifying all divisors of the total number of data tones in the third column (excluding 1 and N_SD_total), and the fifth column identifying tone mapping distance (DTM) and tone mapping distance modulation scheme candidates from the divisors of the fourth column. The tone mapping modulation scheme may be a DTM dual subcarrier modulation (DTM_DCM). In some implementations, DTM is used when DCM is disabled, and DTM_DCM is used when DCM is enabled. The information shown in the table 1100 may apply to LDPC tone mappers that are used to map all data tones across an entire RU and where the DTM and DTM_DCM candidates are selected from the divisors in the fourth column of table 1100. In some implementations, the DTM and DTM_DCM candidates may be determined based on a test or simulation after determining a tone plan. The DTM and DTM_DCM candidates in the firth column are a subset of the divisors of the total number of data tones in the fourth column. For example, in the sixth row of table 110, if the total number of data tones is 1448, the divisors may include 2, 4, 8, 181, 362, and 724. From the divisors of the total number of data tones, the DTM and DTM_DCM candidates may be selected for the LDPC tone mapper, such as 8 and 181.

SU Transmissions with Multiple RUs

APs that implement 802.11ax protocols using OFDM may allocate a single RU to each STA. In some implementations, APs that implement protocols for the family of 802.11 standards (which may be referred to as EHT APs) may allocate multiple RUs to each STA. As described above, 240 and 320 MHz BW transmissions (such as a message) may use 3 or 4 996-tone RUs. In some implementations, an EHT AP may generate an SU 240 or 320 MHz BW transmission (which may be applicable to 320/160+160/160+2×80/4×80/160+80/3×80 MHz BW modes) using three or four RUs, such as three or four 996-tone RUs, for a single STA. The data (such as the raw data) for the STA may be split into three or four parts (as uncorrelated data) prior to encoding, where each part is assigned one of the RUs, such as one 996-tone RU. In some implementations, an EHT AP may generate a 320 MHz BW transmission (which may be applicable to 320/160+160 MHz BW modes) using at least two RUs, such as two 2×996-tone RUs, for a single STA. The data for the STA may be split into two parts (as uncorrelated data) prior to encoding, where each part is assigned one of the RUs, such as one 996-tone RU. In some implementations, an EHT AP may generate an SU 240 or 320 MHz BW transmission (which may be applicable to 160+80/160+2×80 MHz BW modes) using two or three RUs, such as one 2×996-tone RU and one 996-tone RU for the 160+80 MHz BW mode or one 2×996-tone RU and two 996-tone RUs for the 160+2×80 MHz BW mode, for a single STA. The data for the STA may be split into two or three parts (as uncorrelated data) prior to encoding, where each part is assigned one of the RUs, such as one 996-tone RU. In some implementations, for the multiple RUs that are allocated to a single STA and after the data is split into the two or more parts, the encoding and interleaving (such as via the UPC tone mapper) may be performed within each RU and independent from the processing of the other RUs.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that can be described in this specification in the context of separate implementations also can be implemented in combination in a single implementation. Conversely, various features that can be described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, for example, a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave can be included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (for example, tangible media). In addition, in some aspects computer readable medium can comprise transitory computer readable medium (for example, a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (for example, RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus configured to perform wireless communication, comprising:
    a memory that stores instructions;
    a processor coupled with the memory and configured to execute the instructions to:
        determine a tone plan for transmission of a message to one or more destination devices via one of a 240 or 320 MHz total channel bandwidth;
        segment, based on the tone plan, the 240 or 320 MHz total channel bandwidth into a plurality of segments, at least two segments of the plurality of segments having unequal sub-band bandwidths, the at least two segments having unequal numbers of data tones; and
        encode the message by at least one of a binary convolutional code (BCC) or a low density parity check (LDPC) code; and
    a transmitter configured to transmit the message via the 240 or 320 MHz total channel bandwidth.

2. The apparatus of claim 1, wherein a quantity of segments in the plurality of segments is determined based on the tone plan for the 240 or 320 MHz total channel bandwidth, the quantity of segments defined based on multiples of a predefined bandwidth or a grouping of resource units (RUs).

3. The apparatus of claim 1, wherein at least one of the plurality of segments is punctured for at least a portion of its associated bandwidth or at least a subset of the number of data tones.

4. The apparatus of claim 1, wherein the number of data tones of the plurality of segments is unequal based on at least one of:
    a sub-band bandwidth of a first segment of the plurality of segments being unequal to a second segment of the plurality of segments, and
    puncturing within one or more segments of the plurality of segments.

5. The apparatus of claim 1, wherein two or more segments of the plurality of segments have equal sub-band bandwidths.

6. The apparatus of claim 1, wherein the processor is configured to execute the instructions to:
    parse, based on the tone plan, groups of bits associated with the message into each of the plurality of segments according to a ratio,
    wherein the ratio is one of a 1:1 ratio, a 1:2 ratio, a 1:1:1 ratio, or a 1:1:2 ratio between the plurality of segments.

7. The apparatus of claim 1, wherein the processor is configured to execute the instructions to:
    parse, based on the tone plan, groups of bits associated with the message into each of the plurality of segments according to a ratio until a first segment having a smallest segment size of the plurality of segments is filled; and
    parse, based on the tone plan, remaining bits associated with the message into remaining segments of the plurality of segments sequentially.

8. The apparatus of claim 7, wherein the ratio is one of a 1:1 ratio, a 1:2 ratio, a 1:1:1 ratio, or a 1:1:2 ratio between the plurality of segments.

9. The apparatus of claim 1, wherein the processor is configured to execute the instructions to:
    parse, based on the tone plan, bits associated with the message sequentially into each of the plurality of segments.

10. The apparatus of claim 1, wherein two or more segments of the plurality of segments have equal sub-band bandwidths, and wherein the two or more segments of the plurality of segments are punctured such that the two or more segments have equal numbers of available data tones.

11. The apparatus of claim 1, wherein the LDPC tone mapper is configured to encode the message for transmission based on one or more candidate values, wherein the one or more candidate values are each factors of a total number of data tones in the message.

12. The apparatus of claim 1, wherein the transmission of the message includes transmitting the message over at least two resource units (RUs), wherein:
    based on the at least two RUs consisting of two RUs:
        each of the two RUs consists of 484 tones, or
        a first of the two RUs consists of 484 tones and a second of the two RUs consists of 996 tones;
    based on the at least two RUs consisting of three RUs:
        each of the three RUs consists of 996 tones, each of the three RUs consists of 484 tones, or
a first of the three RUs consists of 484 tones, a second of the three RUs consists of 484 tones and a third of the three RUs consists of 996 tones;
based on the at least two RUs consisting of four RUs:
each of the four RUs consists of 996 tones, or
each of the four RUs consists of 484 tones.

13. The apparatus of claim 1, wherein the processor is further configured to:
allocate two or more resource units (RUs) to a first destination device of the one or more destination devices; and
parse, based on the tone plan, bits associated with the message into two or more groups of bits corresponding to the two or more RUs prior to encoding, each of the two or more groups of bits being assigned to a corresponding one of the two or more RUs.

14. The apparatus of claim 13, wherein each of the two or more groups of bits of the corresponding one of the two or more RUs is encoded and interleaved independent of other groups of bits of the two or more groups of bits.

15. The apparatus of claim 13, wherein the transmission of the message includes transmitting the message over the two or more RUs, wherein:
based on the two or more RUs consisting of two RUs:
the two RUs consist of two 2×996-tone RUs, or
the two RUs consist of one 2×996-tone RU and one 996-tone RU.

16. The apparatus of claim 13, wherein the transmission of the message includes transmitting the message over the two or more RUs, wherein:
based on the two or more RUs consisting of three RUs, the three RUs consist of one 2×996-tone RU and two 996-tone RUs.

17. A method for wireless communication by a wireless device, comprising:
determining a tone plan for transmission of a message to one or more destination devices via one of a 240 or 320 MHz total channel bandwidth;
segmenting, based on the tone plan, the 240 or 320 MHz total channel bandwidth into a plurality of segments, at least two segments of the plurality of segments having unequal sub-band bandwidths, the at least two segments having unequal numbers of data tones;
encoding the message by at least one of a binary convolutional code (BCC) or a low density parity check (LDPC) code; and
transmitting the message via the 240 or 320 MHz total channel bandwidth.

18. The method of claim 17, wherein a quantity of segments in the plurality of segments is determined based on the tone plan for the 240 or 320 MHz total channel bandwidth, the quantity of segments defined based on multiples of a predefined bandwidth or a grouping of resource units (RUs).

19. The method of claim 17, wherein at least one of the plurality of segments is punctured for at least a portion of its associated bandwidth or at least a subset of the number of data tones.

20. The method of claim 17, wherein the number of data tones of the plurality of segments is unequal based on at least one of:
a sub-band bandwidth of a first segment of the plurality of segments being unequal to a second segment of the plurality of segments, and
puncturing within one or more segments of the plurality of segments.

21. The method of claim 17, wherein two or more segments of the plurality of segments have equal sub-band bandwidths.

22. The method of claim 17, further comprising:
parsing, based on the tone plan, groups of bits associated with the message into each of the plurality of segments according to a ratio,
wherein the ratio is one of a 1:1 ratio, a 1:2 ratio, a 1:1:1 ratio, or a 1:1:2 ratio between the plurality of segments.

23. The method of claim 17, further comprising:
parsing, based on the tone plan, groups of bits associated with the message into each of the plurality of segments according to a ratio until a first segment having a smallest segment size of the plurality of segments is filled, and
parsing, based on the tone plan, remaining bits associated with the message into remaining segments of the plurality of segments sequentially, wherein the ratio is one of a 1:1 ratio, a 1:2 ratio, a 1:1:1 ratio, or a 1:1:2 ratio between the plurality of segments.

24. The method of claim 17, further comprising:
parsing, based on the tone plan, bits associated with the message sequentially into each of the plurality of segments.

25. The method of claim 17, wherein two or more segments of the plurality of segments have equal sub-band bandwidths, and wherein the two or more segments of the plurality of segments are punctured such that the two or more segments have equal numbers of available data tones.

26. The method of claim 17, further comprising:
encoding the message for transmission based on one or more candidate values, wherein the one or more candidate values are each factors of a total number of data tones in the message.

27. The method of claim 17, further comprising:
allocating two or more resource units (RUs) to a first destination device of the one or more destination devices; and
parsing, based on the tone plan, bits associated with the message into two or more groups of bits corresponding to the two or more RUs prior to encoding, each of the two or more groups of bits being assigned to a corresponding one of the two or more RUs.

28. The method of claim 27, wherein each of the two or more groups of bits of the corresponding one of the two or more RUs is encoded and interleaved independent of other groups of bits of the two or more groups of bits.

29. An apparatus configured to perform wireless communication, comprising:
means for determining a tone plan for transmission of a message to one or more destination devices via one of a 240 or 320 MHz total channel bandwidth;
means for segmenting, based on the tone plan, the 240 or 320 MHz total channel bandwidth into a plurality of segments, at least two segments of the plurality of segments having unequal sub-band bandwidths, the at least two segments having unequal numbers of data tones;
means for encoding the message by at least one of a binary convolutional code (BCC) or a low density parity check (LDPC) code; and
means for transmitting the message via the 240 or 320 MHz total channel bandwidth.

* * * * *